US009914520B2

(12) United States Patent
Tokuda

(10) Patent No.: US 9,914,520 B2
(45) Date of Patent: Mar. 13, 2018

(54) VESSEL PROPULSION APPARATUS

(71) Applicant: YAMAHA HATSUDOKI KABUSHIKI KAISHA, Iwata-shi, Shizuoka (JP)

(72) Inventor: Kota Tokuda, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/202,726

(22) Filed: Jul. 6, 2016

(65) Prior Publication Data
US 2017/0121003 A1    May 4, 2017

(30) Foreign Application Priority Data

Nov. 2, 2015 (JP) ................................. 2015-215945

(51) Int. Cl.
| | | |
|---|---|---|
| *B63H 21/21* | (2006.01) | |
| *B63H 23/08* | (2006.01) | |
| *B63H 23/00* | (2006.01) | |
| *G05D 1/02* | (2006.01) | |
| *B63H 20/00* | (2006.01) | |
| *F02D 41/02* | (2006.01) | |

(52) U.S. Cl.
CPC ........... *B63H 23/08* (2013.01); *B63H 20/001* (2013.01); *B63H 23/00* (2013.01); *F02D 41/022* (2013.01); *G05D 1/0206* (2013.01); *B63H 2021/216* (2013.01); *F02D 2200/0406* (2013.01); *F02D 2200/704* (2013.01); *F02D 2250/06* (2013.01)

(58) Field of Classification Search
CPC .. B63H 2021/216; B63H 23/08; B63H 20/20; F02D 2250/06; F02D 41/009; F02D 2041/0095
See application file for complete search history.

(56) References Cited

U.S. PATENT DOCUMENTS

| | | |
|---|---|---|
| 2003/0106364 A1 | 6/2003 | Kimata et al. |
| 2005/0240337 A1 | 10/2005 | Kohler et al. |
| 2008/0268726 A1 | 10/2008 | Akuzawa |

(Continued)

FOREIGN PATENT DOCUMENTS

| | | |
|---|---|---|
| JP | 2003-120397 A | 4/2003 |
| JP | 2008-274970 A | 11/2008 |

(Continued)

*Primary Examiner* — Andrew Polay
(74) *Attorney, Agent, or Firm* — Keating and Bennett, LLP

(57) ABSTRACT

A vessel propulsion apparatus includes an engine that rotates a crankshaft in a forward rotation direction, a rotation speed detector that detects a rotation speed of the crankshaft, a propeller shaft coupled to a propeller, a shift switch that switches between a shift-in state and a neutral state, a shift state detector, an intake passage, a throttle valve, an intake pressure sensor, and a controller. The controller determines that the crankshaft is reversely rotating by an external force input from the propeller shaft when a predetermined reverse rotation recording condition is satisfied, and stores reverse rotation information. The reverse rotation recording condition includes a condition that an intake pressure after the shift switch switches from a neutral state to a shift-in state while the crankshaft rotates in the forward rotation direction is larger than a value equal to or higher than atmospheric pressure.

10 Claims, 11 Drawing Sheets

(56) References Cited

U.S. PATENT DOCUMENTS

| | | | |
|---|---|---|---|
| 2011/0144890 A1 | 6/2011 | Keiner et al. | |
| 2011/0294372 A1 | 12/2011 | Yamazaki et al. | |
| 2011/0318977 A1* | 12/2011 | Inoue | B63H 21/24 440/1 |
| 2012/0282828 A1 | 11/2012 | Inoue | |
| 2013/0245914 A1* | 9/2013 | Shimizu | F02D 41/042 701/102 |

FOREIGN PATENT DOCUMENTS

| | | |
|---|---|---|
| JP | 2010-106661 A | 5/2010 |
| JP | 2011-247127 A | 12/2011 |
| JP | 2012-7658 A | 1/2012 |
| JP | 2012-232681 A | 11/2012 |

* cited by examiner

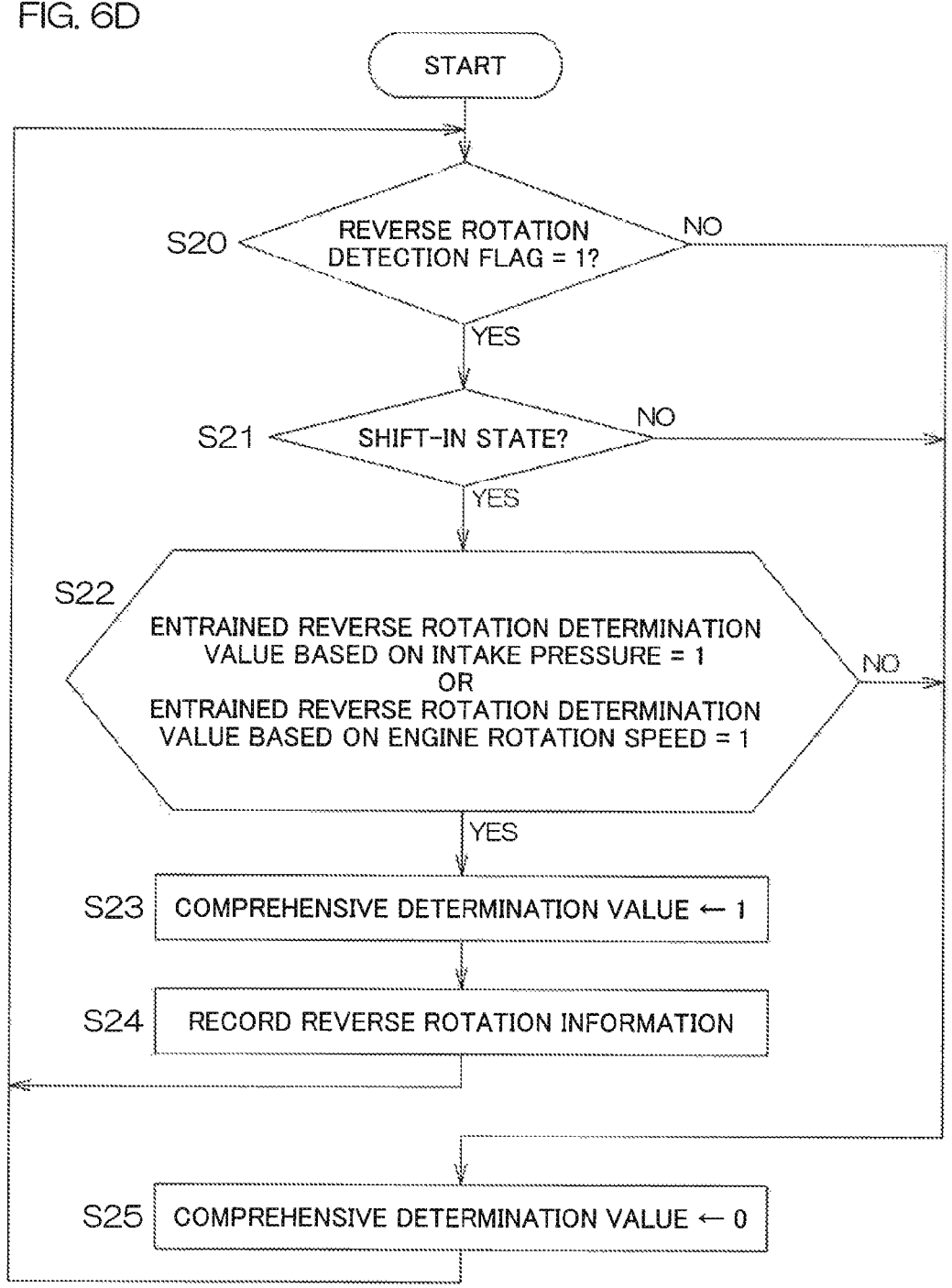

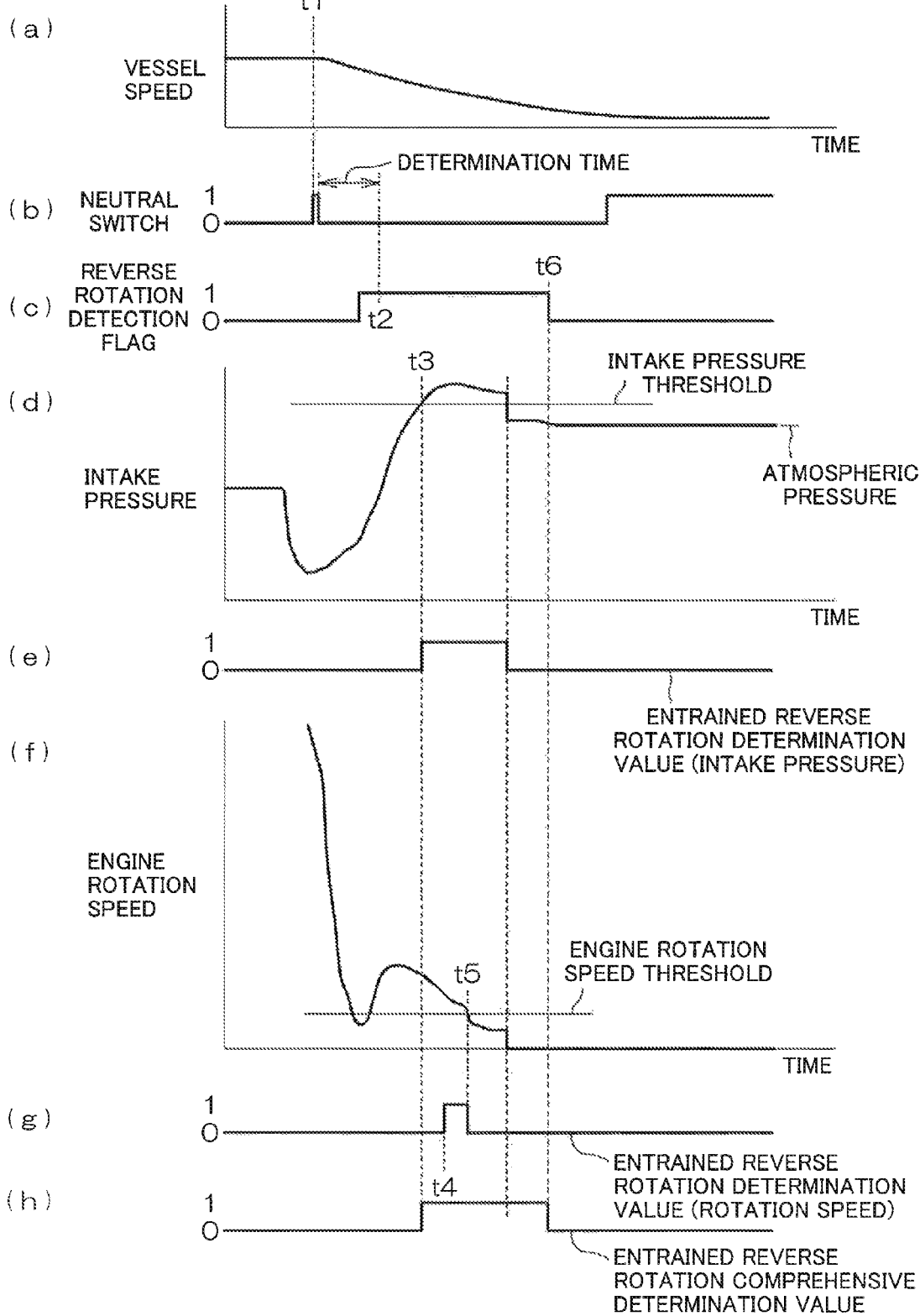

FIG. 8
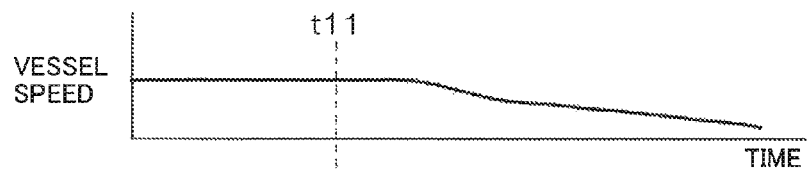
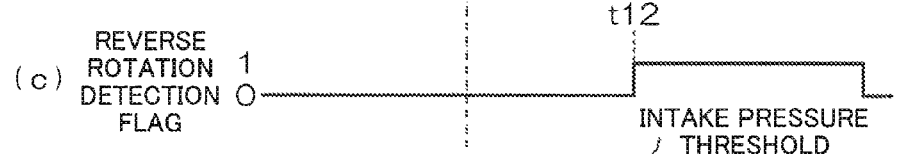
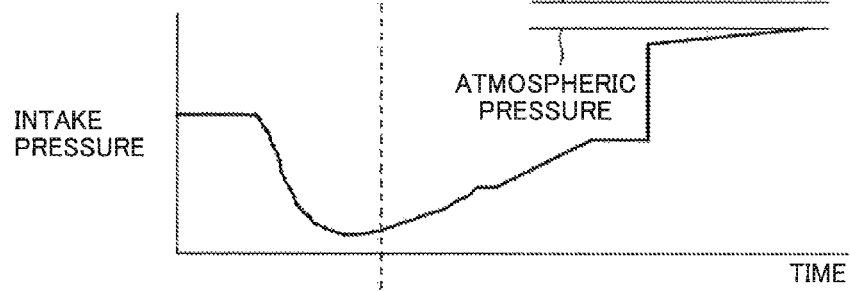
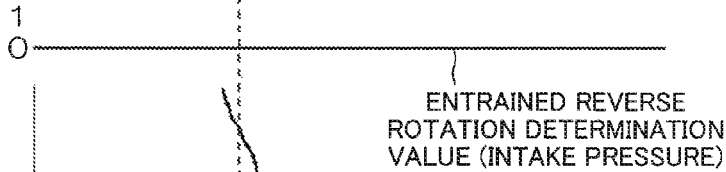
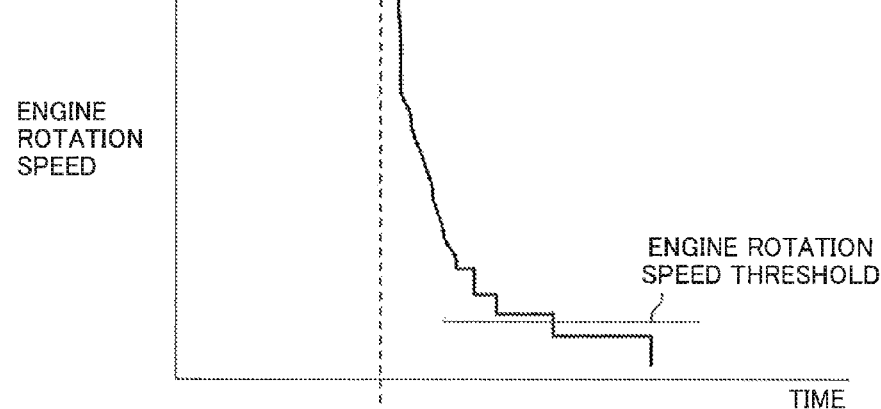
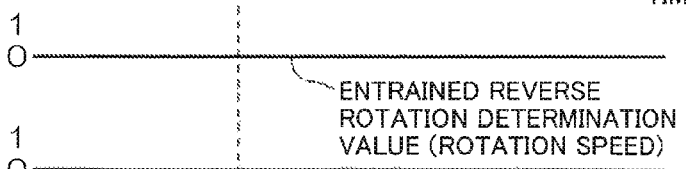
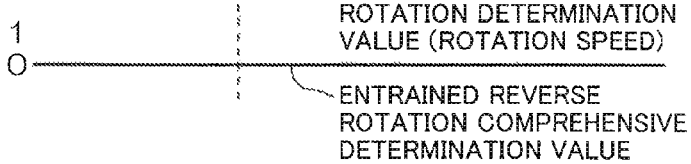

VESSEL PROPULSION APPARATUS

BACKGROUND OF THE INVENTION

1. Field of the Invention

The present invention relates to a vessel propulsion apparatus including an engine (internal combustion engine) as a drive source.

2. Description of the Related Art

An example of a vessel propulsion apparatus is an outboard motor. An outboard motor includes, for example, an engine, a propeller, and a driving force transmitting mechanism that transmits a driving force of the engine to the propeller. The driving force transmitting mechanism includes a shift mechanism that switches transmission of a torque of the engine to the propeller. The shift mechanism switches a shift position of the outboard motor. The shift position includes "forward" to convert the rotation of the engine into forward-traveling rotation (forward rotation) of the propeller, "backward" to convert the rotation of the engine into backward-traveling rotation (reverse rotation) of the propeller, and "neutral" not to transmit the rotation of the engine to the propeller. Provision of this shift mechanism enables the rotation directions of the propeller and the propeller shaft to be switched between the forward rotation direction and the reverse rotation direction while the engine always rotates in one direction.

When a vessel operator switches the shift position from forward to backward in a state in which a vessel equipped with an outboard motor travels forward at a high speed, even though a driving force to be transmitted from an engine to a propeller shaft is a torque in a reverse rotation direction, the propeller is rotated in the forward rotation direction by a water flow generated by inertia acting on the vessel. Normally, this operation method is not recommended from the viewpoint of vessel stability and engine protection. If this operation is performed, however, a torque to reversely rotate the crankshaft of the engine is input from the propeller. If a torque thus reversely input from the propeller exceeds the driving force of the engine, the crankshaft reversely rotates. In particular, in an outboard motor having an exhaust port in the water, due to reverse rotation of the crankshaft, water may be suctioned from the exhaust port and enter the inside of the engine.

Therefore, it has been proposed that reverse rotation of the engine is detected and informed to a user, the engine is stopped, or the power transmission path is blocked by forcibly switching the shift position to neutral.

For example, in the conventional technology described in US 2003/0106364 A1, reverse rotation of the engine is detected based on a pulse output corresponding to rotation of the crankshaft, and when reverse rotation of the engine is detected, ignition and fuel injection are stopped. In the conventional technology described in US 2008/0268726 A1, reverse rotation of the crankshaft is detected based on pulses output corresponding to rotations of the crankshaft and the cam shaft, and when reverse rotation is detected, the shift position is forcibly shifted to neutral.

On the other hand, in the conventional technology described in US 2011/0318977 A1, reverse rotation is detected by monitoring a pressure change of an oil pump or a cooling water pump that is driven by rotation of the crankshaft. For example, a minimum oil pressure Pmin is set, and when the minimum oil pressure Pmin is exceeded at the time of shift switching, it is determined that oil is not supplied by the oil pump, and based on this, it is determined that the crankshaft interlocked with the pump drive shaft is rotating in the reverse direction.

SUMMARY OF THE INVENTION

The inventor of preferred embodiments of the present invention described and claimed in the present application conducted an extensive study and research regarding a vessel propulsion apparatus, such as the one described above, and in doing so, discovered and first recognized new unique challenges and previously unrecognized possibilities for improvements as described in greater detail below.

In the conventional technologies described in US 2003/0106364 A1 and US 2008/0268726 A1, an output pattern of a pulse signal in a predetermined period is detected, so that even during a normal engine stopping operation, a piston is pushed back just before a compression top dead point, and as a result, reverse rotation of the engine may be detected. In addition, when an engine stall is caused not by a vessel operator's operation in such a case of running out of fuel or a case where an obstacle hits against the propeller, reverse rotation may also be detected. Further, noise mixed with a sensor signal, defective wiring of the sensor signal line, and fluctuation of the battery voltage, etc., also cause erroneous detection of reverse rotation. Therefore, with the conventional technologies described in US 2003/0106364 A1 and US 2008/0268726 A1, accurate detection of reverse rotation of the engine according to a reverse input from the propeller is not always possible.

On the other hand, the conventional technology described in US 2011/0318977 A1 in which a pressure of oil or cooling water is monitored is influenced by a manufacturing tolerance of the pump and viscosity fluctuation caused by temperature variations, so that threshold setting is difficult, and highly accurate detection is not always possible.

In order to overcome the previously unrecognized and unsolved challenges described above, a preferred embodiment of the present invention provides a vessel propulsion apparatus including an engine that rotates a crankshaft in a forward rotation direction, a rotation speed detector that detects a rotation speed of the crankshaft, a propeller shaft coupled to a propeller, a shift switch that switches between a shift-in state wherein rotation of the crankshaft is transmitted to the propeller shaft and a neutral state wherein transmission of rotation between the crankshaft and the propeller shaft is blocked, a shift state detector that detects which of the shift-in state and the neutral state the shift switch is in, an intake passage that supplies air to a combustion chamber of the engine, a throttle valve that is provided in the intake passage and adjusts an air volume to be supplied to the combustion chamber, an intake pressure sensor that detects an intake pressure inside the intake passage between the throttle valve and the combustion chamber, and a controller that receives inputs of detection values from the rotation speed detector, the shift state detector, and the intake pressure sensor, and is configured or programmed to determine that the crankshaft is reversely rotating in a direction opposite to the forward rotation direction by an external force input from the propeller shaft when a predetermined reverse rotation recording condition is satisfied, and that stores reverse rotation information, wherein the reverse rotation recording condition includes a first condition that an intake pressure after the shift switch switches from the neutral state to the shift-in state while the crankshaft rotates in the forward rotation direction is larger than a first value equal to or higher than the atmospheric pressure.

With this arrangement, when the reverse rotation recording condition including the first condition that the intake pressure after the shift state switches from the neutral state to the shift-in state is larger than the first value equal to or higher than the atmospheric pressure is satisfied, it is determined that reverse rotation of the crankshaft has been caused by a reverse input from the propeller shaft, and reverse rotation information is recorded.

In a normal operation, air is suctioned from the intake passage and discharged to the exhaust passage, so that the air pressure (intake pressure) inside the intake passage between the throttle valve and the combustion chamber is lower than the atmospheric pressure. On the other hand, when the crankshaft reversely rotates, the air flow inside the engine reverses, and the operation changes to suction air from the exhaust side and discharge air from the intake side. At this time, the intake pressure detected by the intake pressure sensor is higher than the atmospheric pressure.

Therefore, as a result of the above-described operation, reverse rotation of the crankshaft according to a reverse input from the propeller shaft caused by shift switching is reliably detected and reverse rotation information is stored.

In a preferred embodiment of the present invention, the controller is configured or programmed to store an atmospheric pressure measured value when the controller is started as the atmospheric pressure. With this arrangement, influences of fluctuation of the atmospheric pressure are prevented, so that reverse rotation of the crankshaft according to a reverse input from the propeller shaft is accurately detected through monitoring of the intake pressure.

In a preferred embodiment of the present invention, the controller is configured or programmed to store a detection value of the intake pressure sensor when the controller is started as the atmospheric pressure. Accordingly, accurate reverse rotation detection preventing influences of atmospheric pressure fluctuation is enabled by using the intake pressure sensor.

In a preferred embodiment of the present invention, the first value is set to a value obtained by adding a value of 1 kPa or more to the atmospheric pressure. With this arrangement, the threshold for judgment based on the intake pressure is set to be sufficiently larger than the atmospheric pressure, so that reverse rotation of the engine according to a reverse input from the propeller is accurately detected.

In a preferred embodiment of the present invention, the reverse rotation recording condition further includes a second condition that the crankshaft is determined to be reversely rotating based on a pulse output corresponding to rotation of the crankshaft, and the controller is configured or programmed to determine that the crankshaft is reversely rotating in a direction opposite to the forward rotation direction by an external force input from the propeller shaft when the second condition is satisfied and the first condition is satisfied.

With this arrangement, a condition based on a pulse output according to the crankshaft is added, so that reverse rotation of the engine according to a reverse input from the propeller shaft is detected with higher accuracy.

In a preferred embodiment of the present invention, the reverse rotation recording condition further includes a third condition that a state in which a rotation speed detected by the rotation speed detector is higher than a second value continues for a predetermined period of time or longer, and a fourth condition that the crankshaft is determined to be reversely rotating based on a pulse output corresponding to rotation of the crankshaft, and the controller is configured or programmed to determine that the crankshaft is being reversely rotated in a direction opposite to the forward rotation direction by an external force input from the propeller shaft when the fourth condition is satisfied and at least one of the first condition and the third condition is satisfied.

With this arrangement, determination of reverse rotation based on a pulse corresponding to rotation of the crankshaft (satisfaction of the fourth condition) is set as a precondition, and when this determination of reverse rotation is made, in response to satisfaction of the first condition or the third condition, reverse rotation of the crankshaft is determined and reverse rotation information is stored. That is, not only when the first condition is satisfied, but also when a state in which the rotation speed of the crankshaft is higher than the second value continues for a predetermined period of time or longer, it is determined that the crankshaft is reversely rotating. Therefore, in a case where reverse rotation only momentarily occurs as in the case of normal engine stoppage, recording of reverse rotation information is not performed. Accordingly, reverse rotation of the engine caused by a reverse input from the propeller shaft is further accurately detected and recorded.

In a preferred embodiment of the present invention, the second value is smaller than an idle rotation speed of the engine (preferably, about ½ or less of the idle rotation speed), and larger than a stall rotation speed of the engine. With this arrangement, reverse rotation of the engine based on the third condition is more accurately detected.

In a preferred embodiment of the present invention, the controller is configured or programmed to perform misfire control of the engine when it is determined that the crankshaft is reversely rotating based on a pulse output corresponding to rotation of the crankshaft. With this arrangement, continuation of engine driving in the reverse rotating state of the crankshaft is avoided.

In a preferred embodiment of the present invention, the controller is configured or programmed to store the reverse rotation information when the reverse rotation recording condition is satisfied after performing the misfire control according to determination of reverse rotation of the crankshaft based on a pulse output corresponding to rotation of the crankshaft. With this arrangement, after misfire control is performed, whether or not the reverse rotation recording condition is satisfied is determined, so that more accurate reverse rotation determination is performed.

In a preferred embodiment of the present invention, the controller is configured or programmed to switch the shift switch into the neutral state when it is determined that the crankshaft is reversely rotating based on a pulse output corresponding to rotation of the crankshaft. With this arrangement, when reverse rotation of the crankshaft occurs, the shift state is automatically switched to the neutral state, so that the reverse input path from the propeller is blocked. Accordingly, damage to the engine by the reverse rotation is prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6D is a flowchart illustrating an example of a process relating to determination of reverse rotation of the engine and recording of reverse rotation information (comprehensive determination and recording).

FIG. 7 is a time chart illustrating an example of operation when entrained reverse rotation of the engine occurs.

FIG. 8 is a time chart illustrating an example of operation when the engine stops without occurrence of entrained reverse rotation of the engine.

DETAILED DESCRIPTION OF THE PREFERRED EMBODIMENTS

Figure 1:
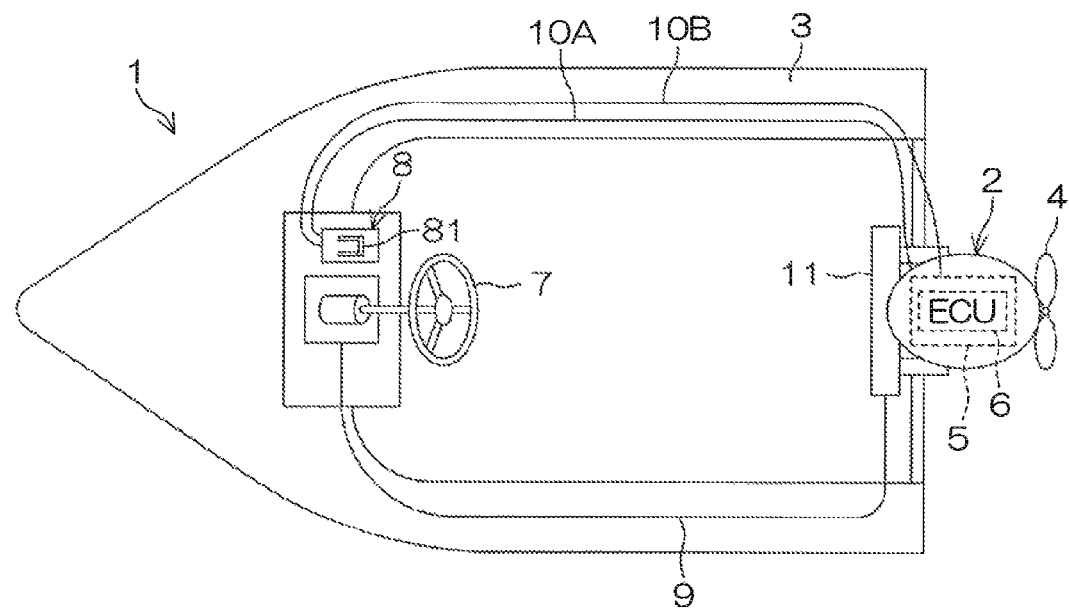
FIG. 1 is a plan view illustrating an arrangement of a vessel equipped with an outboard motor as a vessel propulsion apparatus according to a preferred embodiment of the present invention.

FIG. 1 is a plan view illustrating an arrangement of a vessel equipped with an outboard motor according to a preferred embodiment of the present invention. A vessel 1 includes an outboard motor 2 as an example of a vessel propulsion apparatus and a hull 3. The outboard motor 2 is attached to a rear portion of the hull 3. The outboard motor 2 generates a thrust to propel the hull 3. The outboard motor 2 includes an engine 5 that rotates a propeller 4, and an engine ECU 6 (electronic control unit) that controls the outboard motor 2. In relation to the outboard motor 2, a steering device 11 to turn the outboard motor 2 to the left and right is provided. The hull 3 includes a steering wheel 7 as a steering member and a remote controller 3. When the steering wheel 7 is operated, in response to this, the steering device 11 turns the outboard motor 2 to the left or right, and accordingly, the vessel 1 is steered. The speed of the vessel 1 is adjusted by an operation of an operation lever 81 provided on the remote controller 8. Switching between forward traveling and backward traveling of the vessel 1 is performed by operating the operation lever 81.

The operation force applied to the steering wheel 7 is mechanically transmitted to the steering device 11 via a steering operation cable 9. By actuating the steering device 11 by the operation force, the outboard motor 2 turns to the left or right direction with respect to the hull 3, and in response to this, the direction of the thrust provided to the hull 3 changes leftward or rightward. The remote controller 8 is mechanically coupled to the outboard motor 2 by a shift operation cable 10A and a throttle operation cable 10B. When a vessel operator operates the operation lever 81, the operation force is transmitted to the outboard motor 2 by the shift operation cable 10A and the throttle operation cable 10B. By the operation force transmitted by the shift operation cable 10A, the shift position of the outboard motor 2 is changed. That is, by an operation of the operation lever 81, the direction of the thrust of the outboard motor 2 is switched between the forward traveling direction and the backward traveling direction, and further, the state of the outboard motor 2 is changed into a neutral state in which the power of the engine 5 is not transmitted to the propeller 4. On the other hand, inside the outboard motor 2, a displacement of the throttle operation cable 10B is detected, and according to the result of this detection, the engine ECU 6 controls the position of a throttle valve 48 of the engine 5 (refer to FIG. 4). Accordingly, the throttle opening is changed by electronic control responding to an operation of the operation lever 81, and accordingly, the output of the engine 5 varies.

Figure 2:
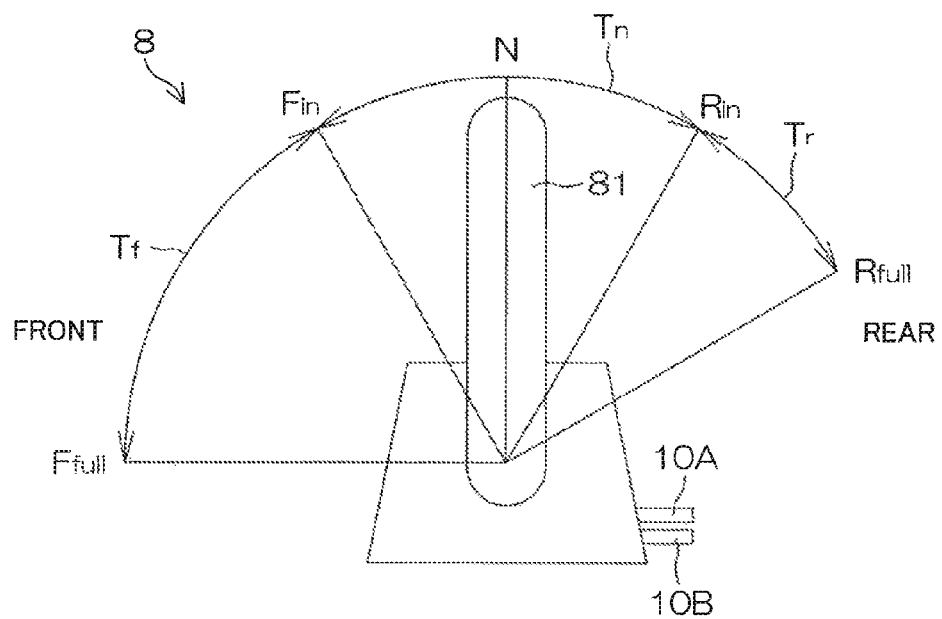
FIG. 2 is a side view of a remote controller to perform a shift operation and an accelerator operation.

FIG. 2 is a side view of the remote controller 8. As shown in FIG. 2, the operation lever 81 of the remote controller 8 is turnable forward and rearward around its lower end portion. The operation lever 81 is tilted forward and rearward around a roughly vertical neutral position N by a vessel operator. The neutral position N is, for example, a position at which the operation lever 81 is vertical or approximately vertical. When the operation lever 81 is tilted forward from the neutral position N to a forward shift-in position Fin, the shift position of the outboard motor 2 changes from neutral to forward, and in response to this, the outboard motor 2 generates a thrust in the forward traveling direction to propel the hull 3 forward. When the operation lever 81 is tilted rearward from the neutral position N to a backward shift-in position Rin, the shift position of the outboard motor 2 changes from neutral to backward, and in response to this, the outboard motor 2 generates a thrust in the backward traveling direction to propel the hull 3 backward. The region between the forward shift-in position Fin and the backward shift-in position Rin is a neutral region Tn in which the shift position of the outboard motor 2 changes to neutral and thrust generated by the outboard motor 2 is stopped.

When the operation lever 81 is further tilted from the forward shift-in position Fin to a forward full-open position Ffull, according to the tilt amount of the operation lever 81, the throttle opening of the engine 5 increases, and the thrust in the forward traveling direction increases. Similarly, when the operation lever 81 is further tilted rearward from the backward shift-in position Rin to the backward full-open position Rfull, the throttle opening of the engine 5 increases, and the thrust in the backward traveling direction increases according to the tilt amount of the operation lever 81. That is, the region from the forward shift-in position Fin to the forward full-open position Ffull is a forward output adjusting region Tf. The region from the backward shift-in position Rin to the backward full-open position Rfull is a backward output adjusting region Tr.

Figure 3:
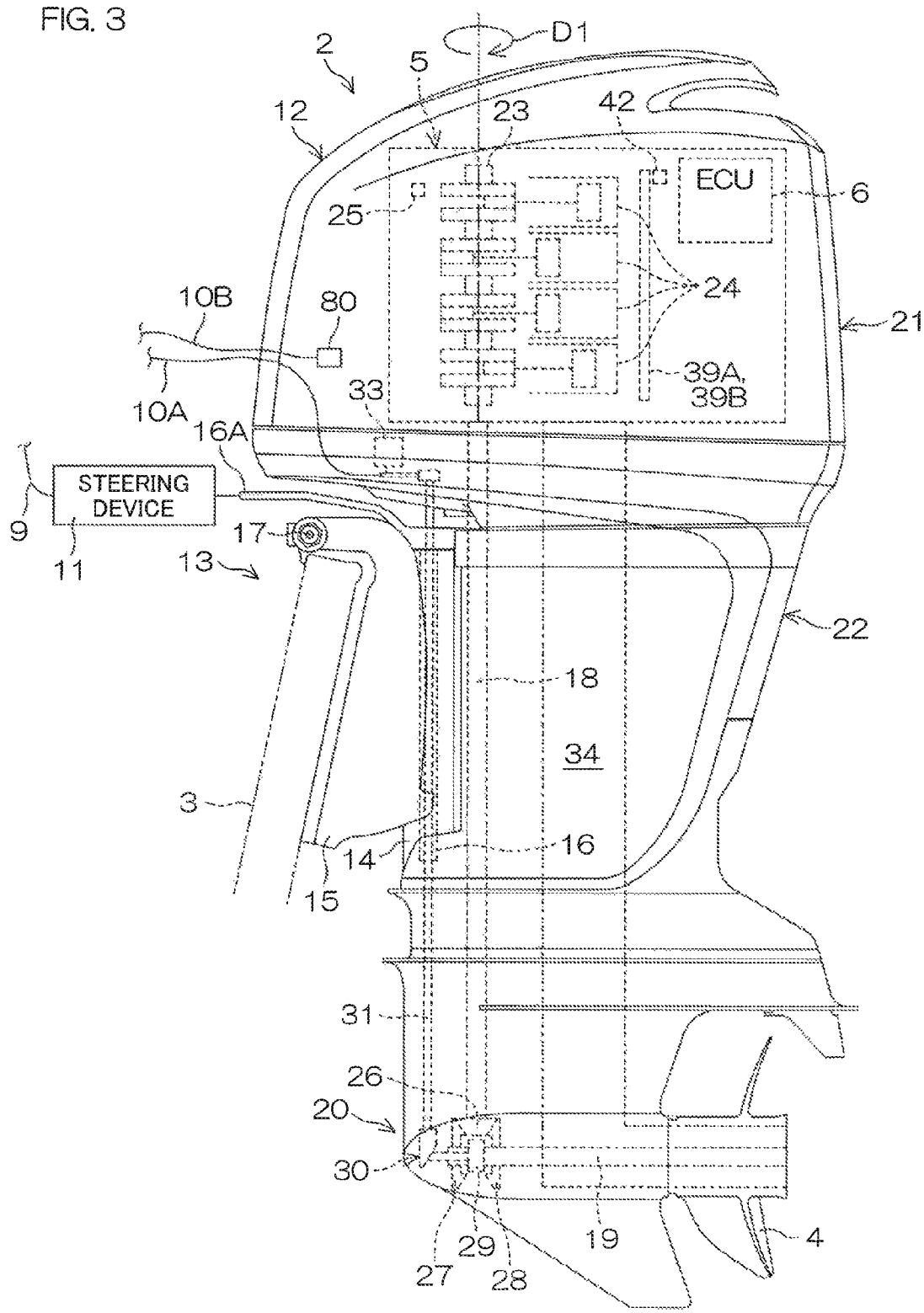
FIG. 3 is a side view of the outboard motor.

FIG. 3 is a side view of the outboard motor 2. The outboard motor 2 includes an outboard motor main body 12 and an attaching mechanism 13. The outboard motor main body 12 is attached to a rear portion of the hull 3 by the attaching mechanism 13. The attaching mechanism 13 includes a swivel bracket 14, a clamp bracket 15, a steering shaft 16, and a tilt shaft 17. The steering shaft 16 is disposed so as to extend vertically. The tilt shaft 17 is disposed horizontally so as to extend in the left-right direction. The swivel bracket 14 is joined to the outboard motor main body 12 via the steering shaft 16. The clamp bracket 15 is joined to the swivel bracket 14 via the tilt shaft 17. The clamp bracket 15 is fixed to a rear portion of the hull 3.

The outboard motor main body 12 is attached in a vertical or approximately vertical posture to the hull 3 by the attaching mechanism 13. The outboard motor main body 12 and the swivel bracket 14 are turnable up and down around the tilt shaft 17 with respect to the clamp bracket 15. By turning the outboard motor main body 12 around the tilt shaft 17, the outboard motor main body 12 is tilted with respect to the hull 3 and the clamp bracket 15. The outboard motor main body 12 is turnable to the left and right together with the steering shaft 16 with respect to the swivel bracket 14 and the clamp bracket 15. When a vessel operator operates the steering wheel 7, the operation force is transmitted to the steering device 11 by the steering operation cable 9, and the steering device 11 is actuated. A driving force of this steering device 11 is transmitted to the steering shaft 16 via a lever 16A. Accordingly, the outboard motor main body 12 turns to the left or right together with the steering shaft 16. Thus, the vessel 1 is steered.

The outboard motor main body 12 includes a drive shaft 18, a propeller shaft 19, and a forward/backward switching mechanism 20. The outboard motor 12 further includes an engine cover 21 and a casing 22. The engine 5 is housed inside the engine cover 21. The drive shaft 18 extends vertically inside the engine cover 21 and the casing 22. The propeller shaft 19 extends forward and rearward inside a lower portion of the casing 22. An upper end portion of the drive shaft 18 is coupled to a crankshaft 23 of the engine 5. A lower end portion of the drive shaft 18 is coupled to a front end portion of the propeller shaft 19 by the forward/backward switching mechanism 20. A rear end portion of the propeller shaft 19 projects rearward from the casing 22. The propeller 4 is coupled to the rear end portion of the propeller shaft 19. The propeller 4 rotates together with the propeller shaft 19.

The engine 5 is an internal combustion engine that generates power by burning a fuel, for example, gasoline. The engine 5 includes the crankshaft 23, a plurality of (for example, four) cylinders 24, cam shafts 39A and 39B, a crankshaft rotation sensor 25, and a cam shaft rotation sensor 42. The engine 5 is disposed so that the crankshaft 23 extends vertically. An upper end portion of the drive shaft 18 is coupled to a lower end portion of the crankshaft 23. The crankshaft 23 is rotatable around a vertical axis. The crankshaft 23 is driven to rotate in one rotation direction (forward direction) D1 by burning in each cylinder 24. Rotation of the crankshaft 23 (rotation of the engine 5) is detected by the crankshaft rotation sensor 25. An output signal (pulse signal) of the crankshaft rotation sensor 25 is input into the engine ECU 6. The engine ECU 6 detects a rotation angle of the crankshaft 23 based on a pulse signal output from the crankshaft rotation sensor 25, and computes an engine rotation speed.

The throttle operation cable 10B is led into the inside of the engine cover 21. An accelerator position sensor 80 that detects a displacement of the throttle operation cable 10B is provided inside the engine cover 21. The accelerator position sensor 80 detects an operation amount (accelerator operation amount) of the operation lever 81 (refer to FIG. 2) by detecting a displacement of the throttle operation cable 10B. An output signal of the accelerator position sensor 80 is input into the engine ECU 6.

The forward/backward switching mechanism 20 is an example of a shift switch. The forward/backward switching mechanism 20 includes a drive gear 26, a forward gear 27, a backward gear 28, a dog clutch 29, and a shift mechanism 30. The drive gear 26, the forward gear 27, and the backward gear 28 are, for example, tubular bevel gears. The drive gear 26 is joined to a lower end portion of the drive shaft 18. The forward gear 27 and the backward gear 28 are engaged with the drive gear 26. The forward gear 27 and the backward gear 28 are disposed so that their teeth portions face each other at a distance in the front-rear direction. The forward gear 27 and the backward gear 28 respectively surround the front end portion of the propeller shaft 19. When rotation of the drive gear 26 is transmitted to the forward gear 27 and the backward gear 28, the forward gear 27 and the backward gear 28 rotate in directions opposite to each other.

The dog clutch 29 is disposed between the forward gear 27 and the backward gear 28. The dog clutch 29 has, for example, a tubular shape. The dog clutch 29 surrounds the front end portion of the propeller shaft 19. The dog clutch 29 is joined to the front end portion of the propeller shaft 19 by, for example, a spline. Therefore, the dog clutch 29 rotates together with the front end portion of the propeller shaft 19. The dog clutch 29 is movable in an axial direction with respect to the front end portion of the propeller shaft 19. The dog clutch 29 is moved in the axial direction of the propeller shaft 19 by the shift mechanism 30.

The shift mechanism 30 includes, for example, a shift rod 31 extending vertically, and a neutral switch 33. The shift rod 31 is coupled to the shift operation cable 10A, and is turned around an axis thereof by an operation force input from the shift operation cable 10A. The dog clutch 29 is moved in the axial direction of the propeller shaft 19 when the shift rod 19 is turned. The dog clutch 29 is disposed at any of a forward position, a backward position, and a neutral position. The neutral switch 33 detects whether or not the position of the dog clutch 29 is at the neutral position. The detection value of the neutral switch 33 is input into the engine ECU 6. The neutral switch 33 is an example of a shift state detector.

The forward position is a position at which the dog clutch 29 engages with the forward gear 27, and the backward position is a position at which the dog clutch 29 engages with the backward gear 28. The neutral position is a position at which the dog clutch 29 does not engage with any of the gears (forward gear 27 and backward gear 28). The neutral position is a position between the forward position and the backward position. In a state in which the dog clutch 29 is disposed at the forward position, rotation of the drive shaft 18 is transmitted to the propeller shaft 19 via the forward gear 27. That is, the shift position of the outboard motor 2 is "forward." In a state in which the dog clutch 29 is disposed at the backward position, rotation of the drive shaft 18 is transmitted to the propeller shaft 19 via the backward gear 28. That is, the shift position of the outboard motor 2 is "backward." In a state in which the dog clutch 29 is disposed at the neutral position, rotation of the drive shaft 18 is not transmitted to the propeller shaft 19. That is, the shift position of the outboard motor 2 is "neutral." Therefore, the neutral switch 33 detects whether or not the shift position of the outboard motor 2 is neutral.

When rotation of the drive shaft 18 is transmitted to the propeller shaft 19 via the forward gear 27, the propeller 4 rotates in the forward-traveling rotation direction. Accordingly, a thrust in the forward traveling direction is generated. When rotation of the drive shaft 18 is transmitted to the propeller shaft 19 via the backward gear 28, the propeller 4 rotates in the backward-traveling rotation direction opposite to the forward-traveling rotation direction. Accordingly, a thrust in the backward traveling direction is generated. Therefore, by switching the position of the dog clutch 29, the rotation direction of the propeller 4 is switched. The rotation direction of the propeller 4 is switched by an operation of the operation lever 81 of the remote controller 8.

The outboard motor main body 12 includes an exhaust passage 34 provided inside the outboard motor main body 12. The exhaust passage 34 includes an exhaust inlet connected to the engine 5 and an exhaust outlet connected to the propeller 4. In a state in which the vessel 1 is launched, the outlet of the exhaust passage 34 is positioned in the water. Therefore, in the state in which the vessel 1 is launched, water that passed through the outlet of the exhaust passage 34 enters a downstream portion of the exhaust passage 34. For example, when the engine 5 rotates at a high speed, water inside the exhaust passage 34 is pushed by a pressure of the exhaust gas discharged from the engine 5 and discharged from the outlet of the exhaust passage 34 together with the exhaust gas. Accordingly, the exhaust gas generated in the engine 5 is discharged into water.

Figure 4:
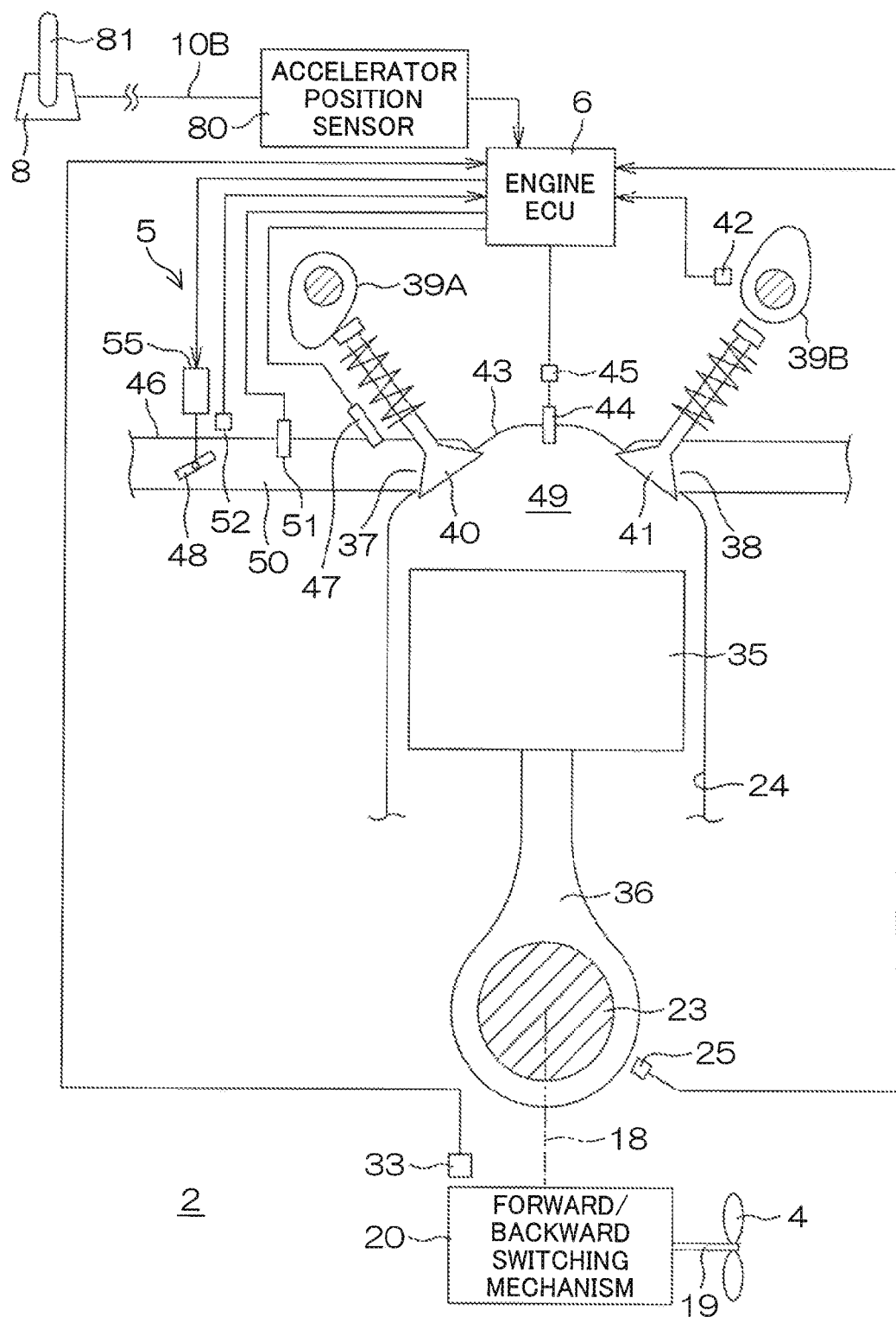
FIG. 4 is a schematic view of an engine provided in the outboard motor.

FIG. 4 is a schematic view of the engine 5. The engine 5 includes pistons 35 disposed inside the respective cylinders 24, connecting rods 36 that join the pistons 35 to the crankshaft 23, intake ports 37, and exhaust ports 38. The intake port 37 and the exhaust port 38 are defined by a cylinder head 43. When the crankshaft 23 is driven to rotate, the rotation of the crankshaft 23 is transmitted to an intake cam shaft 39A and an exhaust cam shaft 39B. Then, by rotations of the cam shafts 39A and 39B, the intake valve 40 and the exhaust valve 41 are respectively driven, and the intake port 37 and the exhaust port 38 are respectively opened and closed at predetermined timings by the intake valve 40 and the exhaust valve 41.

The cam shaft rotation sensor 42 detects rotation of the exhaust cam shaft 39B in the example shown in FIG. 4. However, the cam shaft rotation sensor 42 may detect rotation of the intake cam shaft 39A. Alternatively, both of a cam shaft rotation sensor that detects rotation of the intake cam shaft 39A and a cam shaft rotation sensor that detects rotation of the exhaust cam shaft 39B may be provided.

An output signal (pulse signal) of the cam shaft rotation sensor 42 is input into the engine ECU 6. The engine ECU 6 detects rotations of the cam shafts 39A and 39B based on a pulse signal output from the cam shaft rotation sensor 42. Further, the engine ECU 6 determines whether or not the crankshaft 23 is reversely rotating (whether or not the engine 5 is reversely rotating) based on the pulse signal output from the crankshaft rotation sensor 25 and the pulse signal output from the cam shaft rotation sensor 42.

The engine 5 includes an ignition plug 44 attached to the cylinder head 43, and an ignition coil 45 connected to the ignition plug 44. The engine 5 further includes an intake pipe 46 connected to the intake ports 37 of the respective cylinders 24, fuel injectors 47 provided at the intake ports 37, a throttle valve 48 provided in the intake pipe 46, and a throttle actuator 55 that drives the throttle valve 48. In the intake passage 50 defined by the intake ports 37 and the intake pipe 46, between the throttle valve 48 and the intake port 37, an intake pressure sensor 51 is disposed. The intake pressure sensor 51 detects an air pressure (intake pressure) in the intake passage 50 between the throttle valve 48 and the intake port 37. An output signal of the intake pressure sensor 51 is input into the engine ECU 6. The throttle actuator 55 is controlled by the engine ECU 6 and drives the throttle valve 48 to change the throttle opening.

The engine ECU 6 generates a high voltage by the ignition coil 45. Accordingly, the high voltage is applied to the ignition plug 44, and the ignition plug 44 spark discharges inside the combustion chamber 49 partitioned by the piston 35, the cylinder 24, and the cylinder head 43. Therefore, an air-fuel mixture burns inside the combustion chamber 49. The air-fuel mixture is supplied into the combustion chamber 49 from the intake pipe 46 through the intake port 37. The engine ECU 6 controls the throttle actuator 55 according to an output signal of the accelerator position sensor 80. Therefore, the position of the throttle valve 48 varies according to an operation of the operation lever 81 of the remote controller 8. Accordingly, the supply flow rate of the air-fuel mixture to the cylinder 24 is adjusted, and the output of the engine 5 is adjusted. The position of the throttle valve 48 is detected by a throttle opening sensor 52. An output signal of the throttle opening sensor 52 is input into the engine ECU 6. The engine ECU 6 adjusts the air-fuel ratio by controlling an intake air volume and an injection amount of fuel to be injected from the fuel injector 47.

Figure 5:
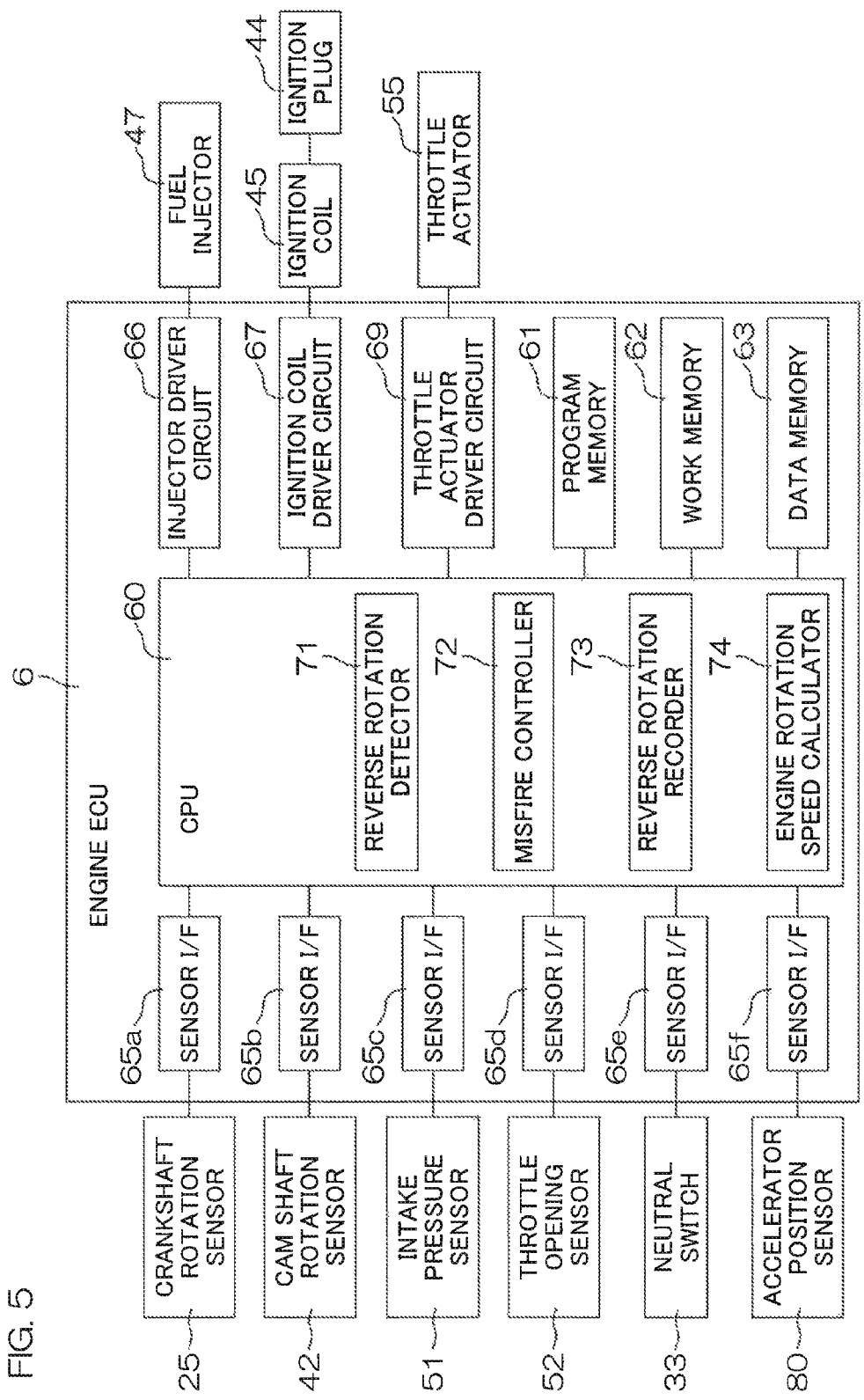
FIG. 5 is a block diagram illustrating an electrical configuration of the vessel.

FIG. 5 is a block diagram illustrating an electrical configuration of the vessel 1, mainly showing an arrangement of the engine ECU 6. The engine ECU 6 is an example of a controller. The engine ECU 6 includes a CPU (Central Processing Unit) 60, a program memory 61 such as a ROM (Read-Only Memory), a work memory 62 including a RAM (Random Access Memory), and a data memory 63. The engine ECU 6 further includes sensor interface (I/F) circuits 65a, 65b, 65c, 65d, 65e, and 65f, an injector driver circuit 66, an ignition coil driver circuit 67, and a throttle actuator driver circuit 69.

The CPU 60 performs arithmetic processing according to various programs, etc., stored in the program memory 61, and controls the entire processing in the engine ECU 6. The CPU 60 uses a storage area of the work memory 62. In the data memory 63, for example, the result of self-diagnosis processing performed by the CPU 60 is written. The data memory 63 preferably includes a memory device (for example, nonvolatile memory) that holds stored information even after the power supply of the engine ECU 6 is shut down.

The sensor interface circuits 65a to 65f perform processes necessary to supply signals transmitted respectively from the crankshaft rotation sensor 25, the cam shaft rotation sensor 42, the intake pressure sensor 51, the throttle opening sensor 52, the neutral switch 33, and the accelerator position sensor 80 to the CPU 60. The injector drive circuit 66, the ignition coil driver circuit 67, and the throttle actuator driver circuit 69 perform various processes necessary to drive the fuel injector 47, the ignition coil 45, and the throttle actuator 55 based on the results of processing in the CPU 60.

The CPU 60 is configured or programmed to function as a plurality of functional process units by executing programs stored in the program memory 61. In detail, the CPU 60 is configured or programmed to function as a reverse rotation detector 71 that determines whether or not the engine 5 is reversely rotating, the misfire controller 72 that causes the engine 5 to misfire and stop when reverse rotation of the engine 5 occurs, a reverse rotation recorder 73 that records reverse rotation information in the data memory 63, and an engine rotation speed calculator 74 that computes an engine rotation speed based on an output of the crankshaft rotation sensor 25, etc. The crankshaft rotation sensor 25 and the engine rotation speed calculator 74 are examples of a rotation speed detector.

FIG. 6A to FIG. 6D are flowcharts illustrating an example of a process of the CPU 60 relating to determination of reverse rotation of the engine 5 and recording of reverse rotation information.

Figure 6A:
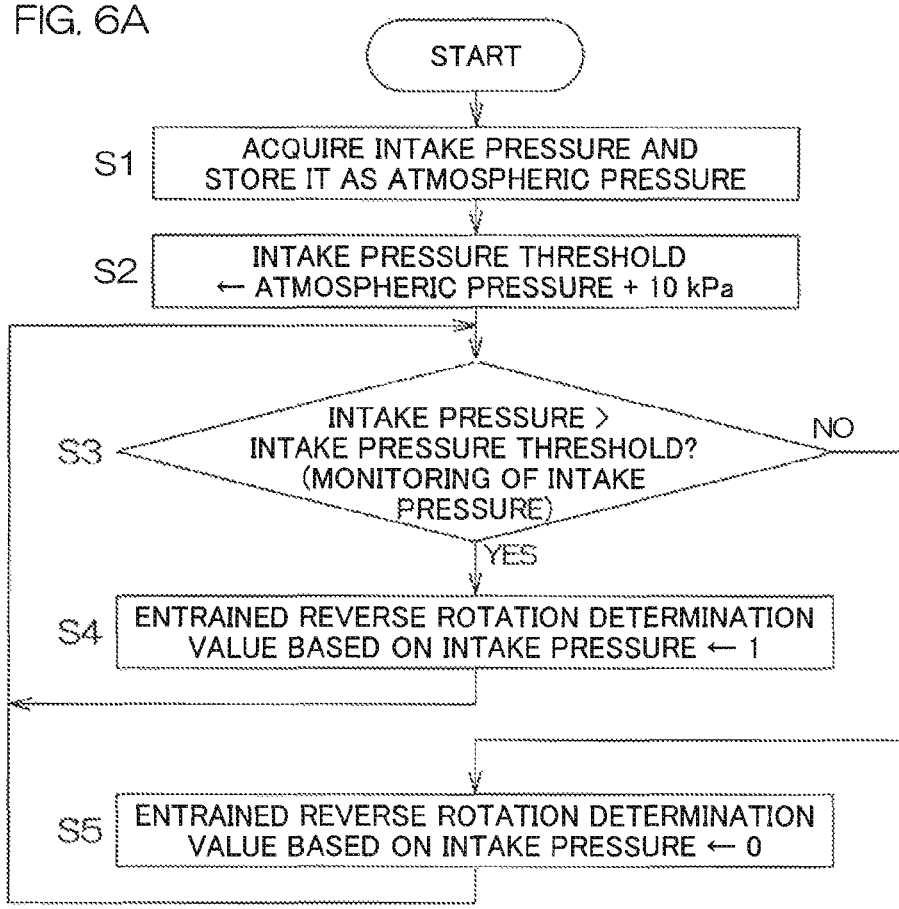
FIG. 6A is a flowchart illustrating an example of a process relating to determination of reverse rotation of the engine and recording of reverse rotation information (setting of an intake pressure threshold, and determination of entrained reverse rotation based on an intake pressure).

As shown in FIG. 6A, when the power supply of the engine ECU 6 is turned on, the CPU 60 acquires an intake pressure detected by the intake pressure sensor 51, and writes and stores the intake pressure as the atmospheric pressure in the work memory 62 (Step S1). In addition, the CPU 60 obtains a value as an intake pressure threshold by adding a predetermined value (preferably 1 kPa or more, for example, 10 kPa) to the atmospheric pressure, and writes and stores it in the work memory 62 (Step S2).

The CPU 60 further repeatedly performs entrained reverse rotation determination based on an intake pressure in a predetermined cycle in a period during which power is applied to the engine ECU 6. In detail, the CPU 60 compares an intake pressure detected by the intake pressure sensor 51 and the intake pressure threshold (Step S3). When the intake pressure is more than the intake pressure threshold (Step S3: YES), the CPU 60 determines that the crankshaft 23 is rotating in the reverse rotation direction together with the propeller 4 by being entrained by the propeller 4 according to a reverse input from the propeller 4, and sets an entrained reverse rotation determination value based on the intake pressure to "1" (Step S4).

When the engine 5 is normally driven, air flows into the combustion chamber 49 inside the cylinder 24 from the intake port 37, and exhaust gas after burning is discharged from the exhaust port 38. At this time, an air pressure inside the intake passage 50 detected by the intake pressure sensor 51 is a negative pressure lower than the atmospheric pressure. On the other hand, when the crankshaft 23 reversely rotates by being entrained by the propeller 4, the air flow direction reverses, and air flows into the combustion chamber 49 from the exhaust port 38 and is discharged to the intake port 37. Therefore, the air pressure inside the intake passage 50 detected by the intake pressure sensor 51 becomes a positive pressure higher than the atmospheric pressure.

In this preferred embodiment, when the intake pressure detected by the intake pressure sensor 51 becomes higher than the intake pressure threshold, which is a predetermined value higher than the atmospheric pressure, the CPU 60 determines that the crankshaft 23 rotates by being entrained by the propeller 4. The "predetermined value" (refer to Step S2 in FIG. 6A) added to the atmospheric pressure to set the intake pressure threshold is determined in advance so that the output of the intake pressure sensor 51 when entrained reverse rotation occurs is higher than the intake pressure threshold. Specifically, the "predetermined value" may be set to 1 kPa or more, for example, to 10 kPa. It is also possible that this predetermined value is set to zero, and the intake pressure threshold is set to the same value as the atmospheric pressure. However, in this case, to prevent erroneous detection, such a condition that the time during which the intake pressure threshold is exceeded is a predetermined period of time or longer is preferably added.

When the intake pressure detected by the intake pressure sensor 51 is equal to or lower than the intake pressure threshold (Step S3: NO), the CPU 60 determines that entrained reverse rotation has not occurred, and sets the entrained reverse rotation determination value based on the intake pressure to "0" (Step S5).

In a period during which power is applied to the engine ECU 6, the CPU 60 always computes an engine rotation speed in a predetermined cycle, and always monitors the intake pressure by acquiring an output signal of the intake pressure sensor 51 in a predetermined cycle. The CPU 60 computes an engine rotation speed by measuring the intervals between a plurality of pulses output from the crankshaft rotation sensor 25 and performs appropriate computation (for example, average value computation). This is a function of the engine rotation speed calculator 74 of the CPU 60. Further, in the period during which power is applied to the engine ECU 6, the CPU 60 always monitors whether or not the forward/backward switching mechanism 20 has been shifted-in from neutral to forward or backward by monitoring the output of the neutral switch 33 in a predetermined cycle.

Figure 6B:
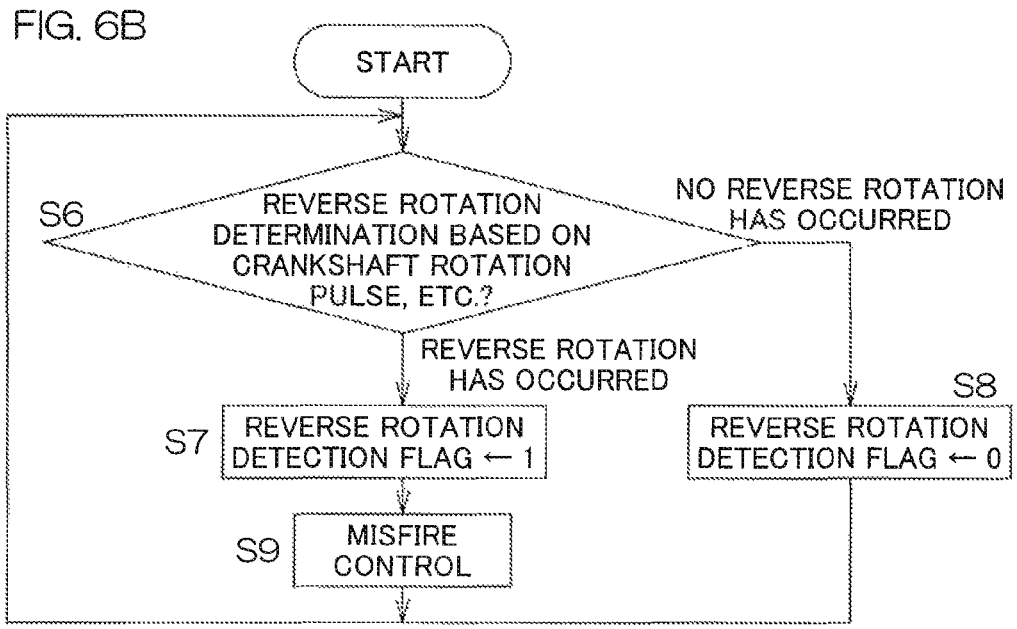
FIG. 6B is a flowchart illustrating an example of a process relating to determination of reverse rotation of the engine and recording of reverse rotation information (determination of reverse rotation based on a crankshaft rotation pulse, etc.).

On the other hand, as shown in FIG. 6B, the CPU 60 determines whether or not the crankshaft 23 is reversely rotating based on a crankshaft rotation pulse signal and a cam shaft rotation pulse signal respectively output from the crankshaft rotation sensor 25 and the cam shaft rotation sensor 42 (Step S6). Further, according to the result of this determination, the CPU 60 sets a reverse rotation detection flag into a set state "1" (Step S7) or a reset state "0" (Step S8). This is a function of the CPU 60 as the reverse rotation detector 71.

For example, the crankshaft rotation sensor 25 generates a pulse signal each time the crankshaft 23 rotates a predetermined angle, and generates a reference signal at a reference rotation angle of the crankshaft 23. Then, based on an output signal of the crankshaft rotation sensor 25, the CPU 60 identifies a rotation angle range in which a predetermined number of pulse signals are output from the reference rotation angle as a "determination rotation angle range." On the other hand, the CPU 60 monitors an appearance pattern of the pulse output from the cam shaft rotation sensor 42 in the identified determination rotation angle range. This pulse appearance pattern differs between when the crankshaft 23 rotates forward and when the crankshaft 23 reversely rotates. Therefore, based on the pulse appearance pattern of the cam shaft rotation sensor 42 in the determination rotation angle range, the CPU 60 determines whether or not the crankshaft 23 is reversely rotating. To perform this determination, for example, the technology disclosed in US 2008/0268726 A1 may be applied.

When the reverse rotation detection flag is not set (Step S8), the CPU 60 does not perform the following process, and repeats the process from Step S6. When the reverse rotation detection flag is set (Step S7), the CPU 60 performs misfire control (Step S9). The misfire control stops the engine 5 such as ignition cut control, injection cut control, etc. The ignition cut control stops ignition of the ignition plug 44, and in detail, power supply to the ignition coil 45 is stopped. The fuel injection control stops fuel injection of the fuel injector 47. The CPU 60 may perform either one of the ignition cut control and the injection cut control, or may perform both of these. The CPU 60 drives the throttle actuator 55 to control the throttle valve 48 to be fully closed along with the ignition cut control and/or the injection cut control. This is a function of the CPU 60 as the misfire controller 72.

The CPU 60 repeatedly performs the process in FIG. 6B in a predetermined cycle in a period during which power is supplied to the engine ECU 6.

Figure 6C:
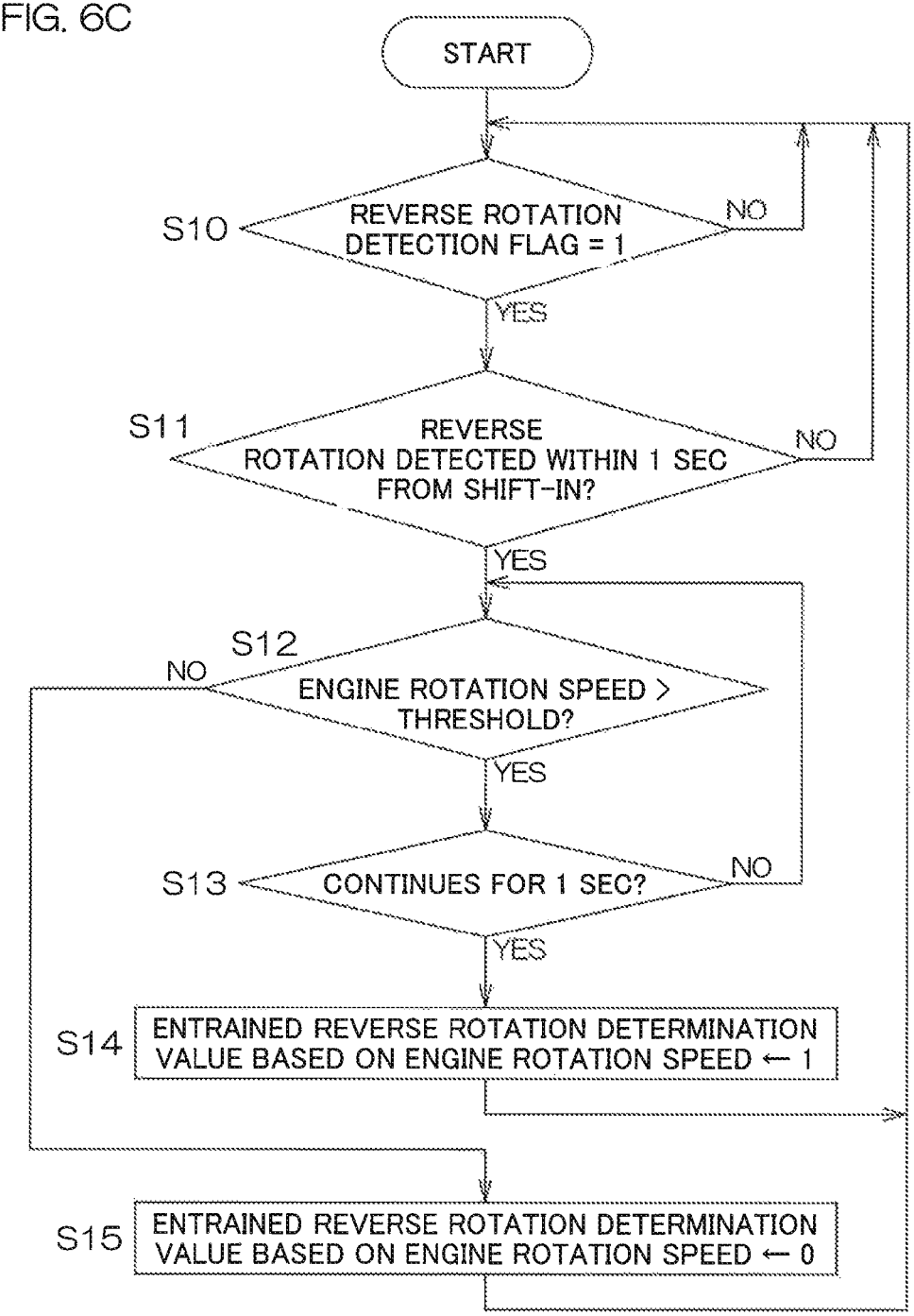
FIG. 6C is a flowchart illustrating an example of a process relating to determination of reverse rotation of the engine and recording of reverse rotation information (determination of entrained reverse rotation based on an engine rotation speed).

The CPU 60 further repeatedly performs entrained reverse rotation determination based on the engine rotation speed in a predetermined cycle in a period during which power is supplied to the engine ECU 6 as shown in FIG. 6C. The CPU 60 determines whether or not the reverse rotation detection flag has been set (Step S10). When the reverse rotation detection flag is not set (Step S10: NO), the following process is omitted. When the reverse rotation detection flag is set (Step S10: YES), the CPU 60 determines whether or not the reverse rotation detection flag has been turned on (set to "1") within a predetermined determination time (for example, 1 second) after shift-in from neutral is detected (Step S11). When the result of this determination is negative, the following process is omitted.

In a case where the reverse rotation detection flag has been turned on within a predetermined determination time after shift-in is detected (Step S11: YES), the CPU 60 determines whether or not the engine rotation speed has exceeded a predetermined engine rotation speed threshold (Step S12). When the engine rotation speed exceeds the engine rotation speed threshold (Step S12: YES), the CPU 60 determines whether or not this state continues for a predetermined continuation determination time (for example, 1 second) (Step S13). When the result of the determination is negative, the process returns to Step S12. When the state in which the engine rotation speed exceeds the engine rotation speed threshold continues for the predetermined continuation determination time (Step S13: YES), the CPU 60 determines that entrained reverse rotation has occurred, and sets the entrained reverse rotation determination value based on the engine rotation speed to "1" (Step S14).

In a case where the reverse rotation detection flag is turned on immediately after shift-in from neutral is detected, reverse rotation of the crankshaft 23 is considered to have occurred. Thereafter, if the state in which the engine rotation speed exceeds the engine rotation speed threshold continues for the continuation determination time, it is determined that reverse rotation of the engine 5 has continued even though misfire control has been performed, so that entrained rotation according to a reverse input from the propeller 4 is considered to have occurred. Therefore, in this case, the CPU 60 determines that the crankshaft 23 is rotating by being entrained by the propeller 4.

The engine rotation speed threshold is set to a value that is smaller than an idle rotation speed of the engine 5 (preferably, about ½ or less of the idle rotation speed), and larger than a stall rotation speed of the engine 5. For example, the engine rotation speed threshold may be set to approximately 200 rpm. The "stall rotation speed" is a rotation speed (for example, about 50 rpm) that the engine ECU 6 determines that an engine stall occurs.

When the engine rotation speed is equal to or less than the engine rotation speed threshold (Step S12: NO), the CPU 60 determines that entrained reverse rotation has not occurred, and sets the entrained reverse rotation determination value based on the engine rotation speed to "0" (Step S15).

The CPU 60 further performs comprehensive determination based on the entrained reverse rotation determination based on the intake pressure and the engine rotation speed in a predetermined cycle in a period during which power is supplied to the engine ECU 6 as shown in FIG. 6D. In detail, the CPU 60 performs the following determinations. These determinations are performed by simultaneous parallel processes. These determinations may be performed sequentially, and in this case, the performing order is not particularly limited.

Step S20: Has the reverse rotation detection flag been set?
Step S21: Shift-in state? (Has the neutral switch 33 not detected neutral?)
Step S22: Is either one of the entrained reverse rotation determination values based on the intake pressure and the engine rotation speed "1"?

When all results of determinations of Step S20 to S22 are affirmative, the CPU 60 determines that entrained reverse rotation has occurred, and sets a "comprehensive determination value" to "1" (Step S23). When the comprehensive determination value is set to "1," the CPU 60 records reverse rotation information in the data memory 63 (Step S24). This is a function of the CPU 60 as the reverse rotation recorder 73. This reverse rotation information recording is performed at an appropriate timing after the comprehensive determination value becomes "1." That is, the reverse rotation information may be recorded immediately after the comprehensive determination value becomes "1," or recording of the reverse rotation information may be included in an end process to be performed when the power supply of the engine ECU 6 is shut down.

When the result of any of the determinations of Steps S20 to S22 is negative, the CPU 60 determines that entrained reverse rotation has not occurred, and sets the "comprehensive determination value" to "0" (Step S25).

The information recorded in the data memory 63 is read out with a dedicated tool that a maintenance operator of a boat builder, etc., owns, so that user's usage conditions is confirmed with high accuracy.

In addition to the conditions of Steps S20 to S22, a condition that "the main switch is on" and/or a condition that "a kill switch is off" may be set as a necessary condition to set the comprehensive determination value to "1."

FIG. 7 is a time chart illustrating an example of operation. FIG. 7(a) shows the forward traveling speed of the vessel 1, FIG. 7(b) shows the state of the neutral switch 33, FIG. 7(c) shows the reverse rotation detection flag, FIG. 7(d) shows the intake pressure, FIG. 7(e) shows the entrained reverse rotation determination value based on the intake pressure, FIG. 7(f) shows the engine rotation speed, and FIG. 7(g) shows the entrained reverse rotation determination value based on the engine rotation speed. FIG. 7(h) shows the comprehensive determination value based on the entrained reverse rotation determination values respectively based on the intake pressure and the engine rotation speed.

A case where, in a state in which the lever 81 of the remote controller 8 is at, for example, the forward full-open position Ffull and the vessel 1 travels at a high speed, a vessel operator operates the operation lever 81 to tilt it to the backward shift-in position Rin or a position on the more backward side is assumed. In response to this operation, the shift position of the outboard motor 2 is switched from forward to backward via neutral. In response to this, the neutral switch 33 goes into an on state for a short period of time from the time t1, and then immediately goes into an off state. Accordingly, the CPU 60 detects shift-in.

When the shift position is at the backward position, a drive torque to be input from the engine 5 into the propeller shaft 19 via the drive shaft 18 tries to rotate the propeller shaft 19 in the backward-traveling rotation direction. On the other hand, the hull 3 is traveling forward at a high speed due to inertia, so that while this occurs, the propeller 4 is rotated in the forward-traveling rotation direction by a reverse input torque from a surrounding water flow. When the reverse input torque caused by a water flow is larger than the drive torque from the engine 5, the propeller shaft 19 rotates in the forward-traveling rotation direction. Therefore, the drive shaft 18 and the crankshaft 23 are reversely rotated by being entrained by rotation of the propeller shaft 19. In detail, the engine rotation speed (rotation speed of the crankshaft 23) rapidly decreases when the shift position switches to backward, and thereafter, when the crankshaft 23 starts to reversely rotate, switches to increase.

When the crankshaft 23 starts to reversely rotate, the relationship of a pulse pattern output from the cam shaft rotation sensor 42 to a pulse pattern output from the crankshaft rotation sensor 25 becomes different from that at the time of forward rotation. This is detected by the CPU 60, and at the time t2 after the crankshaft 23 starts to reversely rotate, the reverse rotation detection flag is set to "1."

According to setting of the reverse rotation detection flag to "1," the CPU 60 performs misfire control. However, when the forward traveling speed of the hull 3 is high, the reverse rotation of the crankshaft 23 continues.

The intake pressure detected by the intake pressure sensor 51 is lower than the atmospheric pressure when the crankshaft 23 rotates in the forward direction. However, when the crankshaft 23 reversely rotates, air is suctioned from the exhaust port 38 into the combustion chamber 49, and the air is discharged from the combustion chamber 49 to the intake port 37, so that the air pressure (intake pressure) inside the intake passage 50 increases. Then, according to continuation of the reverse rotation of the crankshaft 23, the intake pressure reaches the atmospheric pressure and finally exceeds the intake pressure threshold. At the time t3 when the intake pressure threshold is exceeded, the entrained reverse rotation determination value based on the intake pressure (FIG. 7(e)) changes from the normal value "0" to "1."

On the other hand, when the reverse rotation detection flag goes into an on state represented by "1" within a predetermined determination time (for example, 1 second) after the neutral switch changes from "1" (neutral state) to "0" (shift-in state), entrained reverse rotation determination based on the engine rotation speed is made. When the forward traveling speed of the hull 3 is high and a state in which the rotation speed of the crankshaft 23 exceeds the engine rotation speed threshold continues for a predetermined continuation determination time (for example, 1 second), at the time t4, the entrained reverse rotation determination value based on the engine rotation speed (FIG. 7(g)) changes from the normal value "0" to "1." The entrained reverse rotation determination value based on the engine rotation speed changes from "1" to "0" at the time t5 when the engine rotation speed reaches the engine rotation speed threshold or less. The reverse rotation detection flag is reset to "0" when a predetermined time (for example, 0.5 seconds) elapses, for example, after the engine ECU 6 determines an engine stall.

The CPU 60 obtains a logical sum of the entrained reverse rotation determination value based on the intake pressure (FIG. 7(e)) and the entrained reverse rotation determination value based on the engine rotation speed (FIG. 7(g)), and generates an entrained reverse rotation comprehensive determination value (FIG. 7(h)). This entrained reverse rotation comprehensive determination value is reset to "0" at the time t6 when the reverse rotation detection flag changes from "1" to "0." The CPU 60 writes reverse rotation information in the data memory 63 when the entrained reverse rotation comprehensive determination value becomes "1." However, as described above, writing of the reverse rotation information does not necessarily have to be immediately after the entrained reverse rotation comprehensive determination value becomes "1."

FIG. 8 shows an example of operation in a case where the engine 5 stops according to an operation of shift-in to backward, and entrained reverse rotation of the engine 5 according to a water flow does not occur. As in the case of FIG. 7, FIG. 8(a) shows the forward traveling speed of the vessel 1, FIG. 8(b) shows the state of the neutral switch 33, FIG. 8(c) shows the reverse rotation detection flag, FIG. 8(d) shows the intake pressure, FIG. 8(e) shows the entrained reverse rotation determination value based on the intake pressure, FIG. 8(f) shows the engine rotation speed, and FIG. 8(g) shows the entrained reverse rotation determination value based on the engine rotation speed. FIG. 8(h) shows a comprehensive determination value based on the entrained reverse rotation determination values respectively based on the intake pressure and the engine rotation speed.

In a state in which the shift position of the outboard motor 2 is at the forward position and the vessel 1 travels forward, when a vessel operator operates the operation lever 81 to tilt it to the backward shift-in position Rin or a position on the more backward side, the neutral switch 33 goes into an on state for a short period of time from the time t11, and then immediately goes into an off state. Accordingly, the CPU 60 detects shift-in.

The hull 3 travels forward due to inertia, so that while this occurs, the propeller 4 receives a reverse input torque in the forward-traveling rotation direction due to the reverse input torque from a surrounding water flow. This reverse input torque is in a direction opposite to the direction of the drive torque from the engine 5, so that the engine rotation speed (rotation speed of the crankshaft 23) rapidly decreases when the shift position is switched to backward.

In the example of FIG. 8, the engine 5 is stopped by the reverse input torque from the propeller 4. When the engine 5 stops, a resistance to the rotation of the crankshaft 23 becomes maximum just before the compression top dead point. Therefore, the crankshaft 23 may rotate until just before the compression top dead point, and stop after reversely rotating by being pushed back a minute rotation angle by a resistance from the compressed air inside the cylinder 24. Accordingly, based on patterns of the pulses output from the crankshaft rotation sensor 25 and the cam shaft rotation sensor 42, the CPU 60 detects reverse rotation of the crankshaft 23, and in response to this, at the time t12, the reverse rotation detection flag is set to "1."

The intake pressure increases to the atmospheric pressure along with a decrease in engine rotation speed; however, the rotation of the crankshaft 23 stops, so that the intake pressure does not reach the intake pressure threshold beyond the atmospheric pressure. The engine rotation speed is computed based on intervals between a plurality of pulses output from the crankshaft rotation sensor 25, so that the engine rotation speed does not immediately follow the minute angle reverse rotation of the crankshaft 23. Therefore, although the engine rotation speed quickly decreases and reaches zero, it does not switch to increase unless the reverse rotation of the crankshaft 23 continues.

Therefore, although the reverse rotation detection flag is set to "1" due to momentary reverse rotation of the crankshaft 23, the result of entrained reverse rotation determination based on the intake pressure is negative, and the result of entrained reverse rotation determination based on the engine rotation speed is also negative. Therefore, the entrained reverse rotation comprehensive determination value does not become "1," so that reverse rotation information is not written in the data memory 63.

At the time of normal engine stoppage in response to an operation of a kill switch, etc., the piston 35 is also pushed back just before the compression top dead point, and accordingly, the crankshaft 23 may reversely rotate for a short period of time. Even in this case, the reverse rotation detection flag is turned on; however, the results of both entrained reverse rotation determinations based on the intake pressure and the engine rotation speed are negative. Therefore, reverse rotation in the case of normal engine stoppage is not recorded in the data memory 63.

The same also applies to a case of an engine stall not based on a vessel operator's operation such as a case where fuel runs out or an obstacle hits against the propeller, and even if the reverse rotation detection flag is set to "1," reverse rotation information is not recorded in the data memory 63. Further, even if the reverse rotation detection flag is set to "1" due to noise mixed with the sensor signal, defective wiring of the sensor signal line, and fluctuation of the battery voltage, etc., as described above, reverse rotation information is not written in the data memory 63.

Thus, in this preferred embodiment, it is determined whether or not the reverse rotation recording conditions including a condition (first condition) that the intake pressure after the shift state switches from neutral to a shift-in state is larger than the intake pressure threshold are satisfied. The reverse rotation recording conditions are conditions to determine that entrained reverse rotation has occurred and record reverse rotation information in the data memory 63. When the reverse rotation recording conditions are satisfied, it is determined that the crankshaft 23 is reversely rotating according to a reverse input from the propeller shaft 19, and reverse rotation information is stored in the data memory 63.

In a normal operation, air is suctioned from the intake passage 50 and discharged to the exhaust passage 34, so that the air pressure (intake pressure) inside the intake passage 50 between the throttle valve 48 and the combustion chamber 49 is lower than the atmospheric pressure. On the other hand, when the crankshaft 23 reversely rotates, the air flow inside the engine 5 reverses, and an operation to suction air from the exhaust side and discharge the air from the intake side occurs. At this time, the intake pressure detected by the intake pressure sensor 51 is higher than the atmospheric pressure, and reaches the intake pressure threshold. Therefore, by the above-described operation, reverse rotation of the crankshaft 23 according to a reverse input from the propeller shaft 19 caused by shift switching is reliably detected, and reverse rotation information is stored in the data memory 63.

In this preferred embodiment, when power is applied to the engine ECU 6 and the CPU 60 is started, the atmospheric pressure (intake pressure when starting) is measured with the intake pressure sensor 51, and stored in the work memory 62 as an atmospheric pressure for setting an intake pressure threshold. Therefore, influence of fluctuation of the atmospheric pressure is excluded, so that the reverse rotation of the crankshaft 23 according to a reverse input from the propeller shaft 19 is accurately detected through monitoring of the intake pressure. In addition, a dedicated sensor for atmospheric pressure measurement does not need to be provided, and the existing intake pressure sensor 51 is used in common for atmospheric pressure measurement, so that the structure does not become complicated.

In this preferred embodiment, the intake pressure threshold is set to a value obtained by adding a predetermined value of 1 kPa or more (for example, 10 kPa) to the atmospheric pressure. Therefore, since the intake pressure threshold is sufficiently larger than the atmospheric pressure, entrained reverse rotation of the engine 5 according to a reverse input from the propeller 4 is more accurately detected.

Further, in this preferred embodiment, the conditions (second condition and fourth condition) that the reverse rotation detection flag representing the results of reverse rotation determinations based on pulses that the crankshaft rotation sensor 25 and the cam shaft rotation sensor 42 output corresponding to rotation of the crankshaft 23 and rotation of the cam shaft 39B have been set are included in the reverse rotation recording conditions. That is, a condition that the reverse rotation detection flag has been set and the intake pressure has exceeded the intake pressure threshold is set as a reverse rotation recording condition to determine that entrained reverse rotation has occurred and record reverse rotation information in the data memory 63. Accordingly, entrained reverse rotation of the engine 5 according to a reverse input from the propeller shaft 19 is detected with higher accuracy and reverse rotation information is able to be recorded in the data memory 63, so that highly reliable reverse rotation information is recorded in the data memory 63.

In this preferred embodiment, the condition (third condition) that a state in which the engine rotation speed exceeds the engine rotation speed threshold continues for a predetermined period of time or longer is included in the reverse rotation recording conditions. When at least one of this third condition and the first condition that the intake pressure exceeds the intake pressure threshold is satisfied, it is determined that entrained reverse rotation has occurred, and reverse rotation information is written in the data memory 63. Therefore, when only momentary reverse rotation occurs as in the case of normal engine stoppage, recording of reverse rotation information is not performed. Thus, occurrence of entrained reverse rotation of the engine 5 caused by a reverse input from the crankshaft 23 is accurately detected and recorded in the data memory 63.

In this preferred embodiment, based on the premise that the conditions (second condition and fourth condition) that the reverse rotation detection flag have been set based on pulses output from the crankshaft rotation sensor 25 and the cam shaft rotation sensor 42 corresponding to rotation of the crankshaft 23 and rotation of the cam shaft 39B are satisfied, determinations about the first condition and the third condition are performed. Accordingly, entrained reverse rotation of the engine 5 is more accurately detected and reverse rotation information is recorded in the data memory 63.

In addition, in this preferred embodiment, turning-on of the reverse rotation detection flag within a predetermined determination time (for example, 1 second) after shift-in from neutral is detected is set as a precondition for determination of entrained reverse rotation based on the engine rotation speed. Accordingly, entrained reverse rotation caused by shift-in from a high-speed forward traveling state to the backward traveling side is more accurately determined.

The engine rotation speed threshold is smaller than the idle rotation speed of the engine 5 (preferably, about ½ or less of the idle rotation speed) and larger than the stall rotation speed of the engine 5. Therefore, entrained reverse rotation of the engine 5 is more accurately determined based on the engine rotation speed.

In this preferred embodiment, when the reverse rotation detection flag is set based on pulses output from the crankshaft rotation sensor 25 and the cam shaft rotation sensor 42 corresponding to rotation of the crankshaft 23 and rotation of the cam shaft 39B, misfire control of the engine 5 is performed and the engine 5 is stopped. Accordingly, continued driving of the engine 5 while the crankshaft 23 is in a reversely rotating state is avoided. Therefore, the reverse rotation of the engine 5 is quickly stopped, and the engine 5 is protected.

In this preferred embodiment, when the reverse rotation detection flag is set, and after misfire control is accordingly performed, at least one of the first condition and the third condition is satisfied, the reverse rotation recording conditions are satisfied, and reverse rotation information is recorded in the data memory 63. Therefore, it is determined whether or not the reverse rotation recording conditions are satisfied after the misfire control is performed, so that more accurate determination of entrained reverse rotation is made, and accurate reverse rotation information is recorded in the data memory 63.

Figure 9:
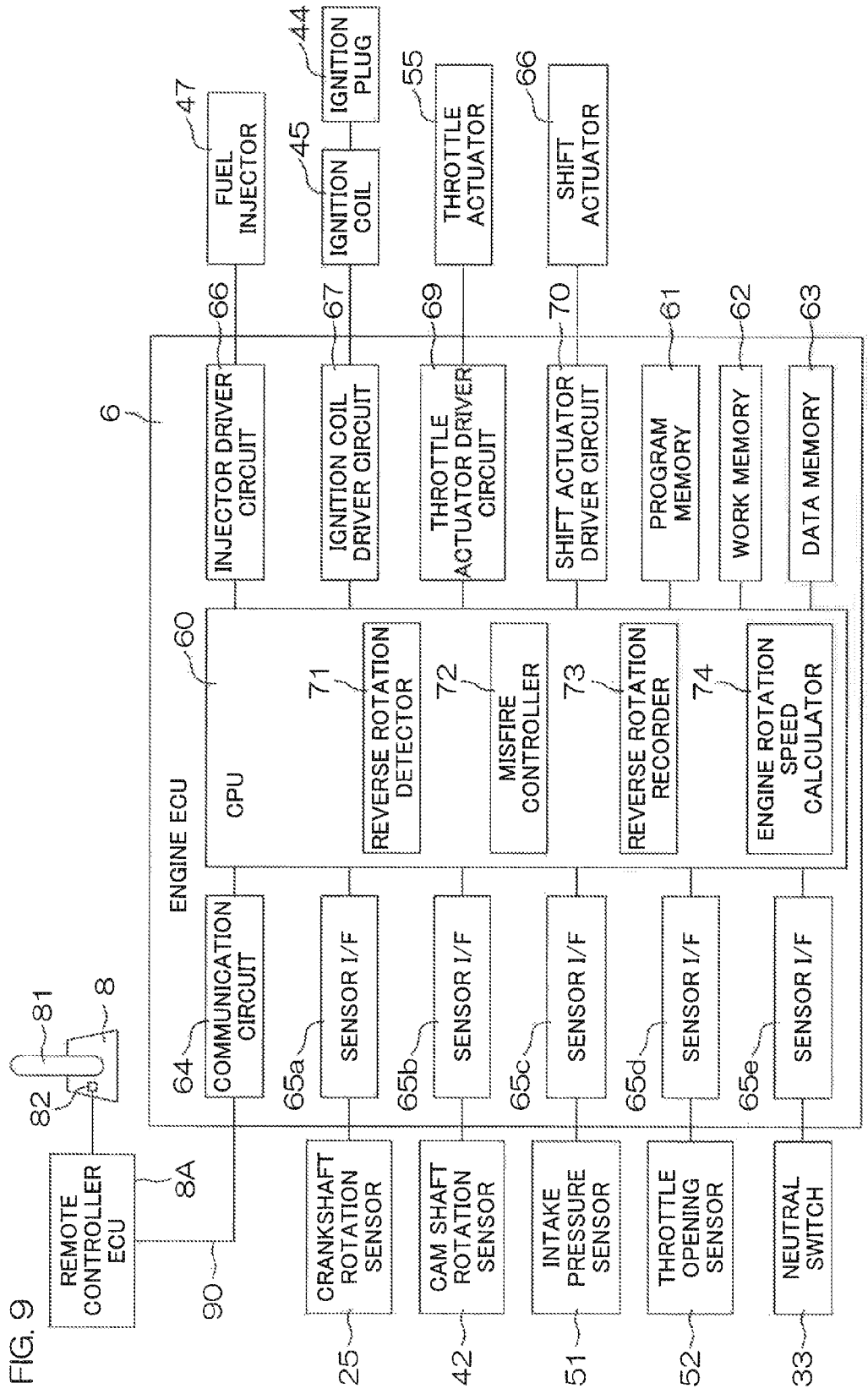
FIG. 9 is a block diagram illustrating an electrical configuration of a vessel according to another preferred embodiment of the present invention.

FIG. 9 is a block diagram illustrating an electrical configuration of a vessel according to another preferred embodiment of the present invention. In FIG. 9, portions corresponding to the respective portions shown in FIG. 5 are designated by the same reference signs.

In this preferred embodiment, connection between the remote controller 8 and the outboard motor 2 is not a mechanical connection using an operation cable, and is replaced by an electrical connection. In detail, a remote controller ECU 8A is associated with the remote controller 8, and the remote controller ECU 8A is connected to a communication circuit 64 provided in the engine ECU 6 via a communication line 90. The communication line 90 may include a cable that defines a CAN (Controller Area Network) inside the vessel 1. The remote controller 8 is provided with an operation position sensor 82 that detects an operation position of the operation lever 81. An output signal of the operation position sensor 82 is input into the remote controller ECU 8A. Based on the output signal of the operation position sensor 82, the remote controller ECU 8A outputs an accelerator command signal to adjust the output of the engine 5 and a shift command signal to command the shift position of the forward/backward switching mechanism 20.

On the other hand, the outboard motor 2 includes a shift actuator 56 to change the shift position of the forward/backward switching mechanism 20 by turning the shift rod 31.

The engine ECU 6 includes a shift actuator driver circuit 70 that supplies electrical power to the shift actuator 56.

The engine ECU 6 adjusts the output of the engine 5 (in detail, the throttle opening) by actuating the throttle actuator 55 according to an accelerator command signal from the remote controller ECU 8A. Therefore, a vessel operator is able to adjust the output of the engine 5 by operating the operation lever 81. The engine ECU 6 changes the shift position of the outboard motor 2 by actuating the shift actuator 56 according to a shift command signal from the remote controller ECU 8A. Therefore, a vessel operator is able to switch the direction of the thrust of the outboard motor 2 between the forward traveling direction and the backward traveling direction by operating the operation lever 81, and further establish a neutral state in which power of the engine 5 is not transmitted to the propeller 4.

Referring to FIG. 2 again, for example, when the operation lever 81 is moved from the neutral position N to the forward shift-in position Fin, a shift command signal to switch the shift position of the outboard motor 2 from neutral to forward is input from the remote controller ECU 8A into the engine ECU 6. Accordingly, the shift position of the outboard motor 2 is switched to forward by the engine ECU 6, and the hull 3 is propelled forward. Further, when the operation lever 81 is tilted from the forward shift-in position Fin to the forward full-open position Ffull, an accelerator command signal to increase the output of the engine 5 is input from the remote controller ECU 8A into the ECU 6, the throttle opening of the engine 5 is increased, and traveling of the vessel 1 is accelerated. Similarly, when the operation lever 81 is moved from the neutral position N to the backward shift-in position Rin, a shift command signal to switch the shift position of the outboard motor 2 from neutral to backward is input from the remote controller ECU 8A into the engine ECU 6. Accordingly, the shift position of the outboard motor 2 is switched to backward by the engine ECU 6, and the hull 3 is propelled backward. Further, when the operation lever 81 is tilted from the backward shift-in position Rin to the backward full-open position Rfull, an accelerator command signal to increase the output of the engine 5 is input from the remote controller ECU 8A into the ECU 6, the throttle opening of the engine 5 increases, and backward traveling of the vessel 1 is accelerated.

Figure 10:
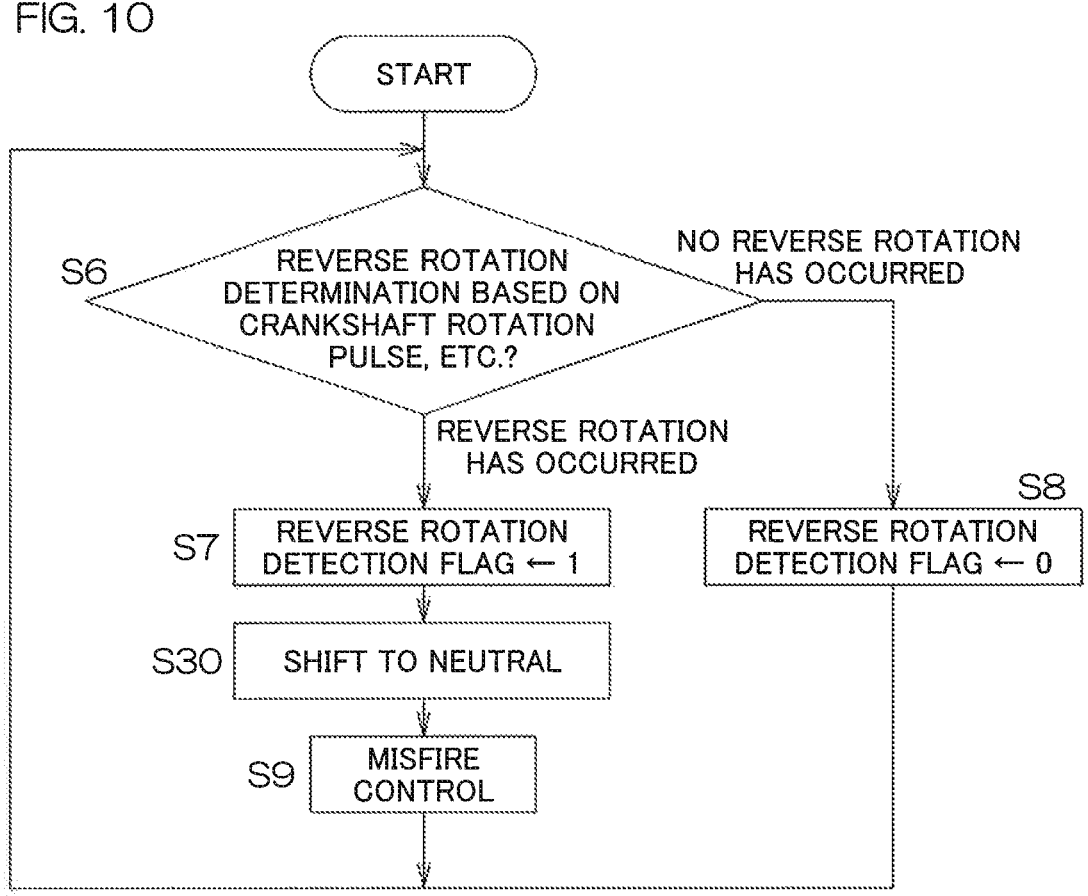
FIG. 10 is a flowchart illustrating a process relating to determination of reverse rotation of the engine and recording of reverse rotation information.

FIG. 10 is a flowchart illustrating a process to be performed by the engine ECU 6. In FIG. 10, a step in which the same process as in the step shown in FIG. 6B is designated by the same reference sign. The engine ECU 6 performs processes shown in FIG. 6A and FIG. 6C to FIG. 6E described in relation to the above described first preferred embodiment, and instead of the above described processes shown in FIG. 6B, performs processes shown in FIG. 10.

In this preferred embodiment, when the reverse rotation detection flag is set (Step S7), the engine ECU 6 forcibly controls the shift position of the forward/backward switching mechanism 20 to neutral by controlling the shift actuator 56 (Step S30). Accordingly, the power transmission path between the propeller 4 and the engine 5 is blocked, so that a reverse input from the propeller 4 into the engine 5 for a long period of time is prevented. Therefore, damage to the engine 5 is reliably prevented. Either of the start of misfire control in Step S9 and the start of shifting to neutral in Step S30 may be earlier, and or may be simultaneous.

Even when the shift actuator 56 is driven to start shifting to neutral, shifting to neutral is not immediately completed due to gear engagement in the forward/backward switching mechanism 20. Therefore, in a period from detection of reverse rotation to actual shifting to neutral, entrained reverse rotation may occur. Such entrained reverse rotation is accurately detected based on the intake pressure and the engine rotation speed, and accordingly, highly accurate reverse rotation information is recorded.

Preferred embodiments of the present invention have been described above; however, the present invention can also be carried out according to still other preferred embodiments.

For example, in the above described preferred embodiments, both of entrained reverse rotation determination based on the intake pressure (Step S3, the first condition) and entrained reverse rotation determination based on the engine rotation speed (Steps S12 and S13, the third condition) preferably are performed. However, one of these may be omitted. In addition, in the above described preferred embodiments, reverse rotation determination based on pulse signals output from the crankshaft rotation sensor 25 and the cam shaft rotation sensor 42 corresponding to rotations of the crankshaft 23 and the cam shafts 39A and 39B (Step S6, the second condition and the fourth condition) is preferably performed. However, this determination may be omitted.

In the above described preferred embodiments, the neutral switch 33 preferably is provided as a shift state detector. However, a shift position sensor that detects forward, backward, and neutral in a discriminating manner may be used instead.

Further, in the above described first preferred embodiment, the shift actuator 56 as in the second preferred embodiment may be provided.

In the above described preferred embodiments, the atmospheric pressure preferably is measured with the intake pressure sensor 51. However, a sensor to measure the atmospheric pressure may be provided separately from the intake pressure sensor 51. When the intake pressure sensor 51 is used in common to detect the atmospheric pressure, the processes in Steps S1 and S2 of FIG. 6A need to be performed before the engine 5 is started. On the other hand, when the atmospheric pressure is measured with a sensor separate from the intake pressure sensor 51, measurement of the atmospheric pressure (Step S1) and setting of the intake pressure threshold (Step S2) may be performed at arbitrary timings, and these may be performed after the engine 5 is started.

Further, in the above-described preferred embodiments, the atmospheric pressure preferably is measured when power is applied to the engine ECU 6, and based on the measured atmospheric pressure, the intake pressure threshold is set. However, it is also possible that the atmospheric pressure measurement is omitted, and a fixed intake pressure threshold is applied.

In the above-described preferred embodiments, an electronic throttle that detects the position of the operation lever 81 by the accelerator position sensor 80 or the operation position sensor 82, and electronically controls the throttle opening by the engine ECU 6, is used. However, preferred embodiments of the present invention may also be applied to a configuration including a mechanical throttle that mechanically transmits an operation of the operation lever 81 to the throttle valve 48 by a throttle operation cable.

Further, in FIG. 4 described above, the port injection engine in which the fuel injector 47 injects fuel to the intake port 37 is shown. However, preferred embodiments of the present invention are also applicable to a direct injection engine that directly injects fuel into the cylinder 24.

In the above-described preferred embodiments, an outboard motor is described by way of example. However, various preferred embodiments of the present invention is also applicable to other types of vessel propulsion apparatuses such as an inboard motor, an inboard/outboard motor, etc.

The present application claims priority to Japanese Patent Application No. 2015-215945 filed in the Japan Patent Office on Nov. 2, 2015, and the entire disclosure of which is incorporated herein by reference.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A vessel propulsion apparatus comprising:
   an engine that rotates a crankshaft in a forward rotation direction;
   a rotation speed detector that detects a rotation speed of the crankshaft;
   a propeller shaft coupled to a propeller;
   a shift switch that switches between a shift-in state in which rotation of the crankshaft is transmitted to the propeller shaft and a neutral state in which transmission of rotation between the crankshaft and the propeller shaft is blocked;
   a shift state detector that detects which of the shift-in state and the neutral state the shift switch is in;
   an intake passage that supplies air to a combustion chamber of the engine;
   a throttle valve that is provided in the intake passage and adjusts an air volume to be supplied to the combustion chamber;
   an intake pressure sensor that detects an intake pressure inside the intake passage between the throttle valve and the combustion chamber; and
   a controller that receives inputs of detection values from the rotation speed detector, the shift state detector, and the intake pressure sensor, and is configured or programmed to determine that the crankshaft is reversely rotated in a direction opposite to the forward rotation direction by an external force input from the propeller shaft when a predetermined reverse rotation recording condition is satisfied, and that stores reverse rotation information; wherein
   the reverse rotation recording condition includes a first condition that an intake pressure after the shift switch switches from the neutral state to the shift-in state while the crankshaft rotates in the forward rotation direction is larger than a first value equal to or higher than an atmospheric pressure.

2. The vessel propulsion apparatus according to claim 1, wherein, when the controller is started, the controller is configured or programmed to store an atmospheric pressure measured value as the atmospheric pressure.

3. The vessel propulsion apparatus according to claim 1, wherein, when the controller is started, the controller is configured or programmed to store a detection value of the intake pressure sensor as the atmospheric pressure.

4. The vessel propulsion apparatus according to claim 1, wherein the first value is a value obtained by adding a value of 1 kPa or more to the atmospheric pressure.

5. The vessel propulsion apparatus according to claim 1, wherein
   the reverse rotation recording condition further includes a second condition that reverse rotation of the crankshaft is determined based on a pulse output corresponding to rotation of the crankshaft; and
   the controller is configured or programmed to determine that the crankshaft is reversely rotating in the direction opposite to the forward rotation direction by the external force input from the propeller shaft when the second condition is satisfied and the first condition is satisfied.

6. The vessel propulsion apparatus according to claim 1, wherein
   the reverse rotation recording condition further includes a third condition that a state in which the rotation speed detected by the rotation speed detector is higher than a second value continues for a predetermined period of time or longer, and a fourth condition that the crankshaft is determined to be reversely rotating based on a pulse output corresponding to rotation of the crankshaft; and
   the controller is configured or programmed to determine that the crankshaft is reversely rotating in the direction opposite to the forward rotation direction by the external force input from the propeller shaft when the fourth condition is satisfied and at least one of the first condition and the third condition is satisfied.

7. The vessel propulsion apparatus according to claim 6, wherein the second value is smaller than an idle rotation speed of the engine, and larger than a stall rotation speed of the engine.

8. The vessel propulsion apparatus according to claim 1, wherein
   the controller is configured or programmed to perform misfire control of the engine when it is determined that the crankshaft is reversely rotating based on a pulse output corresponding to rotation of the crankshaft; and
   the misfire control of the engine stops the engine.

9. The vessel propulsion apparatus according to claim 8, wherein the controller is configured or programmed to store the reverse rotation information when the reverse rotation recording condition is satisfied after the misfire control is performed in accordance with a determination that the crankshaft is reversely rotating based on the pulse output corresponding to rotation of the crankshaft.

10. The vessel propulsion apparatus according to claim 1, wherein the controller is configured or programmed to switch the shift switch into the neutral state when it is determined that the crankshaft is reversely rotating based on a pulse output corresponding to rotation of the crankshaft.

* * * * *